(12) United States Patent
Yu

(10) Patent No.: US 11,314,388 B2
(45) Date of Patent: Apr. 26, 2022

(54) METHOD FOR VIEWING APPLICATION PROGRAM, GRAPHICAL USER INTERFACE, AND TERMINAL

(71) Applicant: Huawei Technologies Co., Ltd., Shenzhen (CN)

(72) Inventor: Liang Yu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 16/313,796

(22) PCT Filed: Jun. 30, 2016

(86) PCT No.: PCT/CN2016/088015
§ 371 (c)(1),
(2) Date: Dec. 27, 2018

(87) PCT Pub. No.: WO2018/000382
PCT Pub. Date: Jan. 4, 2018

(65) Prior Publication Data
US 2019/0155462 A1 May 23, 2019

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/0488* (2013.01);
(Continued)

(58) Field of Classification Search
CPC .......... G06F 3/0483; G06F 9/451; G06F 9/48; G06F 3/0488; G06F 3/0482;
(Continued)

(56) References Cited

U.S. PATENT DOCUMENTS 6,002,397 A * 12/1999 Jaaskelainen, Jr. ...... G09G 5/14
715/797
6,567,102 B2 * 5/2003 Kung .................... G06F 3/0481
345/173
(Continued)

FOREIGN PATENT DOCUMENTS

CN   102541399 A   7/2012
CN   103425332 A   12/2013
(Continued)

OTHER PUBLICATIONS

Machine Translation and Abstract of Chinese Publication No. CN105094618, Nov. 25, 2015, 34 pages.
(Continued)

*Primary Examiner* — Steven B Theriault
(74) *Attorney, Agent, or Firm* — Conley Rose, P.C.

(57) ABSTRACT

A method for viewing an application program, graphical user interface, and a terminal, where the method includes receiving a first input, where the first input viewing a plurality of running application programs stacked for displaying, obtaining an input position corresponding to the first input and non-position information corresponding to the first input in the input position, determining, according to the input position and the non-position information, an application program reachable by the first input in the input position, and displaying the application program reachable by the first input in the input position. Hence, the method for viewing the application program, the graphical user interface, and the terminal simplify a user's operation of viewing a blocked application program in the stacked application programs.

20 Claims, 18 Drawing Sheets

(51) Int. Cl.
*G06F 9/451* (2018.01)
*G06F 9/48* (2006.01)
*G06F 3/0488* (2022.01)
*G06F 3/0482* (2013.01)
*G06F 3/04883* (2022.01)

(52) U.S. Cl.
CPC .......... *G06F 3/04883* (2013.01); *G06F 9/451* (2018.02); *G06F 9/48* (2013.01)

(58) Field of Classification Search
CPC ....... G06F 3/04883; G06F 2203/04105; G06F 3/0416; G06F 3/016; G06F 3/04886; G06F 3/04842; G06F 3/0445; G06F 3/0484; G06F 3/01; G06F 2203/04803; G06F 2203/04806; G06F 2203/014; G06F 3/048

See application file for complete search history.

(56) References Cited

U.S. PATENT DOCUMENTS

| | | | | |
|---|---|---|---|---|
| 6,654,036 | B1* | 11/2003 | Jones | G06F 3/0481 715/788 |
| 6,657,644 | B1* | 12/2003 | Plow | G06T 11/60 715/786 |
| 6,670,970 | B1* | 12/2003 | Bonura | G06F 3/0481 715/768 |
| 7,019,757 | B2* | 3/2006 | Brown | G06F 3/0481 345/589 |
| 8,816,989 | B2* | 8/2014 | Nicholson | G06F 3/04883 178/18.01 |
| 8,997,017 | B2* | 3/2015 | Stecher | G09G 5/14 715/790 |
| 9,030,419 | B1* | 5/2015 | Freed | G06F 3/0416 345/173 |
| 9,071,870 | B2* | 6/2015 | Koivisto | G06F 3/0485 |
| 9,182,948 | B1* | 11/2015 | O'Riordan | G05B 19/042 |
| 9,256,342 | B2* | 2/2016 | Davidson | G06F 3/0481 |
| 9,256,917 | B1* | 2/2016 | Khafizova | G06F 9/453 |
| 9,257,098 | B2* | 2/2016 | Eskolin | G06F 3/0488 |
| 9,389,718 | B1* | 7/2016 | Letourneur | G06F 3/0412 |
| 9,389,722 | B2* | 7/2016 | Matsuki | G06F 3/016 |
| 9,405,428 | B2* | 8/2016 | Roh | G06F 3/04817 |
| 9,417,781 | B2* | 8/2016 | Lee | G06F 3/0483 |
| 9,436,344 | B2* | 9/2016 | Kuwabara | G06F 3/048 |
| 9,594,469 | B2* | 3/2017 | Jakobs | G06F 9/451 |
| 9,600,116 | B2* | 3/2017 | Tao | G06F 3/04142 |
| 9,645,732 | B2* | 5/2017 | Butcher | G06F 3/0482 |
| 9,904,438 | B2* | 2/2018 | Park | G06F 3/0488 |
| 10,025,477 | B1* | 7/2018 | Khafizova | G06F 3/1226 |
| 10,114,526 | B2* | 10/2018 | Muto | G06F 3/0482 |
| 10,140,003 | B1* | 11/2018 | Khafizova | G06F 3/04883 |
| 10,152,216 | B2* | 12/2018 | Kim | G06F 3/0488 |
| 10,303,354 | B2* | 5/2019 | Alonso Ruiz | G06F 3/0488 |
| 10,346,020 | B2* | 7/2019 | Chirogene | G06F 3/016 |
| 10,496,260 | B2* | 12/2019 | Zambetti | G06F 3/0482 |
| 10,705,649 | B2* | 7/2020 | Li | G06F 3/0412 |
| 11,011,138 | B2* | 5/2021 | Kim | G06F 3/0481 |
| 2003/0014415 | A1* | 1/2003 | Weiss | G06F 16/9577 |
| 2004/0021643 | A1* | 2/2004 | Hoshino | G06F 3/03547 345/173 |
| 2004/0141016 | A1* | 7/2004 | Fukatsu | G06F 16/954 715/856 |
| 2005/0110769 | A1* | 5/2005 | DaCosta | G06F 3/0418 345/173 |
| 2006/0061597 | A1* | 3/2006 | Hui | G06F 3/0481 345/629 |
| 2006/0132455 | A1* | 6/2006 | Rimas-Ribikauskas | G06F 3/0488 345/173 |
| 2006/0271877 | A1* | 11/2006 | Theurer | G06F 9/451 715/781 |
| 2006/0284858 | A1* | 12/2006 | Rekimoto | G06F 3/033 345/173 |
| 2007/0273667 | A1* | 11/2007 | Shin | G06F 3/04883 345/173 |
| 2008/0024459 | A1* | 1/2008 | Poupyrev | G06F 3/016 345/173 |
| 2008/0094367 | A1* | 4/2008 | Van De Ven | G06F 3/0414 345/173 |
| 2008/0195969 | A1* | 8/2008 | Brown | G06F 3/04847 715/802 |
| 2008/0297475 | A1* | 12/2008 | Woolf | G06F 3/0233 345/163 |
| 2009/0031237 | A1* | 1/2009 | Jessen | G06F 3/0481 715/768 |
| 2009/0138811 | A1* | 5/2009 | Horiuchi | G06F 3/04842 715/768 |
| 2009/0150775 | A1* | 6/2009 | Miyazaki | G06F 3/04815 715/702 |
| 2009/0178009 | A1* | 7/2009 | Dotson | G06F 16/904 715/841 |
| 2009/0237374 | A1* | 9/2009 | Li | G06F 3/0488 345/174 |
| 2009/0293009 | A1* | 11/2009 | Meserth | G06F 3/0362 715/771 |
| 2010/0017710 | A1* | 1/2010 | Kim | G06F 3/04845 715/702 |
| 2010/0128002 | A1* | 5/2010 | Stacy | G06F 3/044 345/174 |
| 2010/0275122 | A1* | 10/2010 | Buxton | G06F 1/1626 715/728 |
| 2010/0287493 | A1* | 11/2010 | Majumder | G06F 3/0481 715/788 |
| 2011/0018695 | A1* | 1/2011 | Bells | G06F 3/016 340/407.2 |
| 2011/0050628 | A1* | 3/2011 | Homma | G06F 3/0236 345/174 |
| 2011/0050629 | A1* | 3/2011 | Homma | G06F 3/0488 345/174 |
| 2011/0063248 | A1* | 3/2011 | Yoon | G06F 3/0485 345/174 |
| 2011/0128164 | A1* | 6/2011 | Kang | G06F 3/0481 340/995.16 |
| 2011/0187655 | A1* | 8/2011 | Min | G06F 1/1643 345/173 |
| 2011/0214084 | A1* | 9/2011 | Kim | G06F 3/04883 715/780 |
| 2011/0279388 | A1* | 11/2011 | Jung | G06F 3/04883 345/173 |
| 2011/0279395 | A1* | 11/2011 | Kuwabara | G06F 3/0488 345/173 |
| 2011/0285659 | A1* | 11/2011 | Kuwabara | G06F 3/041 345/173 |
| 2011/0291945 | A1* | 12/2011 | Ewing, Jr. | G06F 3/0485 345/173 |
| 2011/0310049 | A1* | 12/2011 | Homma | G06F 3/04883 345/173 |
| 2012/0105358 | A1* | 5/2012 | Momeyer | G06F 3/0414 345/174 |
| 2012/0126962 | A1* | 5/2012 | Ujii | G06F 3/0488 340/407.2 |
| 2012/0131501 | A1* | 5/2012 | Lazaridis | G06F 16/168 715/804 |
| 2012/0159364 | A1* | 6/2012 | Hyun | G06F 3/0481 715/766 |
| 2012/0210270 | A1* | 8/2012 | Kwon | G06F 3/04886 |
| 2012/0242692 | A1* | 9/2012 | Laubach | G06F 3/04883 345/629 |
| 2012/0293551 | A1* | 11/2012 | Momeyer | G06F 3/0488 345/633 |
| 2013/0033414 | A1* | 2/2013 | Zheng | G06F 1/1601 345/1.1 |
| 2013/0113715 | A1 | 5/2013 | Grant et al. | |
| 2013/0132895 | A1* | 5/2013 | Nemeth | G06F 3/0482 715/799 |
| 2013/0141364 | A1* | 6/2013 | Lynn | G06F 3/165 345/173 |
| 2013/0145313 | A1* | 6/2013 | Roh | G06F 3/0481 715/802 |

(56) References Cited

U.S. PATENT DOCUMENTS

| | | | |
|---|---|---|---|
| 2013/0155018 A1* | 6/2013 | Dagdeviren | G06F 3/0416 345/174 |
| 2013/0219308 A1* | 8/2013 | Britton | G06F 16/29 715/764 |
| 2013/0249806 A1* | 9/2013 | Crisan | G06F 3/04883 345/173 |
| 2013/0305184 A1* | 11/2013 | Kim | G06F 3/0481 715/781 |
| 2013/0314364 A1* | 11/2013 | Nicholson | G06F 3/04842 345/174 |
| 2014/0007163 A1* | 1/2014 | Johnson | H04N 21/42224 725/43 |
| 2014/0049483 A1* | 2/2014 | Kim | G06F 3/0488 345/173 |
| 2014/0059460 A1* | 2/2014 | Ho | G06F 3/0488 715/766 |
| 2014/0168093 A1* | 6/2014 | Lawrence | G06F 3/0414 345/173 |
| 2014/0253466 A1* | 9/2014 | Brewer | H04W 12/1206 345/173 |
| 2014/0267135 A1* | 9/2014 | Chhabra | G06F 3/0414 345/174 |
| 2014/0298247 A1* | 10/2014 | Cho | G06F 3/0481 715/781 |
| 2014/0365854 A1 | 12/2014 | Karunamuni et al. | |
| 2015/0029149 A1* | 1/2015 | Andersson | G06F 3/0483 345/174 |
| 2015/0067519 A1* | 3/2015 | Missig | G06F 3/016 715/732 |
| 2015/0185990 A1* | 7/2015 | Thompson | G01C 21/3617 715/800 |
| 2015/0193096 A1* | 7/2015 | Lee | G06F 3/04842 715/739 |
| 2016/0048304 A1* | 2/2016 | Niranjani | G06F 3/04842 715/800 |
| 2016/0154536 A1* | 6/2016 | Kim | G06F 3/04883 715/768 |
| 2016/0179318 A1* | 6/2016 | Patel | H04N 21/482 715/765 |
| 2016/0202852 A1* | 7/2016 | Park | G06F 3/04886 715/781 |
| 2016/0210025 A1* | 7/2016 | Bernstein | G06F 3/0482 |
| 2016/0259495 A1* | 9/2016 | Butcher | G06F 3/04883 |
| 2016/0259517 A1* | 9/2016 | Butcher | G06F 3/04845 |
| 2016/0357305 A1* | 12/2016 | Wells | G06F 3/04842 |
| 2016/0357368 A1* | 12/2016 | Federighi | G06F 3/04815 |
| 2017/0090580 A1* | 3/2017 | Pothier | G01S 17/58 |
| 2017/0109037 A1* | 4/2017 | Seo | G06F 3/0482 |
| 2017/0115791 A1* | 4/2017 | Sheik-Nainar | G06F 1/1643 |
| 2018/0284892 A1* | 10/2018 | Kwon | G06F 3/0412 |

FOREIGN PATENT DOCUMENTS

| | | |
|---|---|---|
| CN | 104166505 A | 11/2014 |
| CN | 105094618 A | 11/2015 |
| CN | 105159530 A | 12/2015 |
| CN | 105373321 A | 3/2016 |
| CN | 105607829 A | 5/2016 |
| CN | 105677178 A | 6/2016 |

OTHER PUBLICATIONS

Machine Translation and Abstract of Chinese Publication No. CN105159530, Dec. 16, 2015, 26 pages.

Machine Translation and Abstract of Chinese Publication No. CN105373321, Mar. 2, 2016, 12 pages.

Foreign Communication From A Counterpart Application, PCT Application No. PCT/CN2016/088015, English Translation of International Search Report dated Apr. 12, 2017, 2 pages.

Foreign Communication From A Counterpart Application, PCT Application No. PCT/CN2016/088015, English Translation of Written Opinion dated Apr. 12, 2017, 6 pages.

* cited by examiner

METHOD FOR VIEWING APPLICATION PROGRAM, GRAPHICAL USER INTERFACE, AND TERMINAL

CROSS-REFERENCE TO RELATED APPLICATIONS

This application is a U.S. National Stage of International Patent Application No. PCT/CN2016/088015 filed on Jun. 30, 2016, which is hereby incorporated by reference in its entirety.

TECHNICAL FIELD

The present invention relates to the field of man-machine interaction technologies, and in particular, to a method for viewing an application program, graphical user interface, and a terminal.

BACKGROUND

A user usually starts a plurality of application programs on a terminal device such as a mobile phone. Because the terminal device has a limited screen size, the started application programs are usually stacked for displaying. Most commonly, the screen usually can display only an application program in a top layer, but other running application programs are blocked by the application program displayed in the top layer on the screen and cannot be seen by the user.

In the prior art, to view other application programs running in a system, the user needs to trigger, in a particular manner, for example, by touching a Home key, displaying of a list of running application programs. Thumbnails of the application programs running in the system are arranged in the list according to an order. Then the user needs to find a to-be-viewed application program from the list, and select the to-be-viewed application program. Only in this way can the application program to be viewed by the user be adjusted to the top layer and displayed on the screen.

However, a user operation required in the method for viewing an application program according to the prior art is complex, and it is inconvenient for the user to view a blocked application program in the application programs that are stacked for displaying.

SUMMARY

Embodiments of the present invention provide a method for viewing an application program, graphical user interface, and a terminal, so as to simplify a user's operation of viewing a blocked application program in stacked application programs.

According to a first aspect, a method for viewing an application program is provided and includes: receiving a first input; obtaining an input position corresponding to the first input and non-position information corresponding to the first input in the input position; then determining, according to the input position and the non-position information, an application program that is reachable by the first input in the input position; and finally displaying the application program that is reachable by the first input in the input position.

Specifically, the first input is used to view a plurality of running application programs that are stacked for displaying. The plurality of running application programs are stacked for displaying in a first display area.

In a specific implementation, the first input may be a touch operation detected by a touchscreen. Correspondingly, the non-position information corresponding to the first input may be touch pressure detected by a pressure sensor disposed under the touchscreen, or may be a touch area captured by the touchscreen, or may be a touch time recorded by a timer, or the like. This is not limited herein. In some embodiments, the first input may also be a gesture operation detected by a gesture sensor. Correspondingly, the non-position information corresponding to the first input may be a gesture depth. Actually, the first input may also be an input operation of another type. This is not limited herein.

The implementation of the method described in the first aspect can simplify a user's operation of viewing a blocked application program in stacked application programs, and can implement simultaneous displaying of content output by a plurality of application programs in the stacked application programs, making it convenient for the user to view the stacked application programs.

With reference to the first aspect, in some embodiments, the application program that is reachable by the first input in the input position may be determined by using the following method: First, stacked application programs in the input position are determined according to the input position. Then the application program that is reachable by the first input in the input position is determined from the stacked application programs in the input position according to the non-position information.

Specifically, the application program that is reachable by the first input in the input position may be determined by using the following method: A quantity N of the reachable application programs is calculated according to a numeric value Q corresponding to the non-position information and a logical distance D between application programs in two adjacent layers. Then a first-layer application program to an $N^{th}$-layer application program are determined from the stacked application programs in the input position as the application programs that are reachable by the first input in the input position.

In some embodiments, the quantity $N=f(Q/D)$ may be calculated according to the numeric value Q and the logical distance D by using the following process, where the function f may be a linear function. For example, $N=f(Q/D)=\theta*(Q/D)(\theta>0)$. Simply, when $\theta=1$, every time touch pressure Q increases by a numeric value D, a lower layer application program that is reachable by the first input is added. In some possible embodiments, the function f may also be a non-linear function. That is, there is no linear change relationship between the touch pressure and the quantity of the application programs that are reachable by the first input.

In some embodiments, to ensure that every stacked application program has an opportunity to be reachable by the first input, the logical distance D between application programs in two adjacent layers may be dynamic, and $D=Q_{Limit}/M$. That is, the logical distance D may be determined according to a quantity M of the application programs that are currently stacked. $Q_{Limit}$ indicates an upper limit of the numeric value of the non-position information that can be identified by a system, for example, the touch pressure.

The following describes how to display, in the first display area, the application program that is reachable by the first input in the input position.

With reference to the first aspect, in some embodiments, the reachable application programs may be displayed in a nested manner by using the input position as a center. Specifically, the reachable application programs are displayed separately in N sub display areas included in the first display area, where a sub display area displays content correspondingly output by a reachable application program in the sub display area, and a sub display area corresponding to a reachable $i^{th}$-layer application program is nested in a periphery of a sub display area corresponding to a reachable $(i+1)^{th}$-layer application program; where i<N, i is a positive integer, and N is the quantity of application programs that are reachable by the first input in the input position.

It should be noted that, creating a display area corresponding to each reachable application program by using the input position as a center may include the following cases: If the sub display area is a rectangle, the center may be an intersecting point of two diagonal lines of the rectangle; if the sub display area is a circle or an ellipse, the center may be a center of the circle or the ellipse; or if the sub display area is a sector, the center may be a vertex of the sector. A policy for determining "the center" is not limited in the embodiments of the present invention.

In the embodiments of the present invention, the system refreshes, in real time, content correspondingly output by each reachable application program in a display area corresponding to the application program.

With reference to the first aspect, in some embodiments, only a bottom-layer application program that is reachable by the first input in a position of the coordinates may be displayed in the first display area. In this way, in a single attempt, the user can completely view content output by the reachable bottom-layer application program in the first display area.

For example, when the touch pressure corresponding to the first input is 0, the application program that is reachable by the first input in the position of the coordinates of the first input is only a top-layer application program currently displayed in the first display area, for example, Facebook. In this case, Facebook is both a reachable top-layer application and a reachable bottom-layer application. In response to the first input whose touch pressure is 0, only Facebook may be displayed in the first display area.

For example, when the touch pressure corresponding to the first input increases to Q1, it is assumed that application programs that are reachable by the first input in the position of the coordinates of the first input include Facebook and Google Maps from top to bottom. In this case, Google Maps is a reachable bottom-layer application. In response to the first input whose touch pressure is Q1, only Google Maps is displayed in the first display area.

In the embodiments of the present invention, the first input may change in real time, and the change includes a change of the input position and a change of the non-position information. Details are as follows:

With reference to the first aspect, in some embodiments, if the change of the input position of the first input is detected, an application program that is reachable by the first input in a new input position may be determined, and then the application program that is reachable by the first input in the new input position is displayed in the nested manner in the first display area by using the new input position as a center.

With reference to the first aspect, in some embodiments, if an increase of the numeric value of the non-position information such as the touch pressure of the first input is detected, an added application program that is reachable by the first input in the input position may be determined, and then in a display area of a current reachable bottom-layer application program, a sub display area for displaying the added reachable application program is created.

With reference to the first aspect, in some embodiments, if a decrease of the numeric value of the non-position information such as the touch pressure of the first input is detected, an application program that is no longer reachable by the first input in the input position may be determined, and then a display area corresponding to the deep layer application program that is no longer reachable is removed from a display area of an application program in a layer above the application program that is no longer reachable.

In some possible implementations, the input position and the non-position information corresponding to the first input may also change simultaneously.

In the embodiments of the present invention, the first input may be released.

With reference to the first aspect, in some embodiments, if releasing of the first input is detected, displaying the reachable application program in the first display area is kept within a specified delay time, for example, two seconds. In this way, the user can implement an operation of adjusting a display status of the reachable application program in the first display area within the specified delay time, for example, cancel displaying of the application program. In the embodiments of the present invention, this operation is referred to as a second input.

Specifically, within the specified delay time, if the second input is detected, the display status of the application program that is reachable by the first input in the input position may be adjusted according to an operation type of the second input. For example, displaying of the reachable application program is canceled.

Specifically, when the specified delay time arrives, displaying of the reachable application program in the first display area is canceled.

For the reachable application programs that are displayed in the nested manner, in some possible implementations, to clearly distinguish each reachable application program, a corresponding application icon may be set for the display area corresponding to each reachable application program. For example, an application icon of Google Maps is set in an upper right corner of a display area corresponding to Google Maps, and an application icon of an album is set in an upper right corner of a sub display area of the album.

For the reachable application programs that are displayed in the nested manner, in some possible implementations, a size of the display area corresponding to each reachable application program may be a fixed value. In some possible implementations, the size of the display area corresponding to each reachable application program may also be related to the numeric value of the non-coordinate information corresponding to the first input, for example, the touch pressure. For example, if the touch pressure is greater, the display area is larger.

According to a second aspect, a graphical user interface on a terminal device is provided, where the terminal device has a touchscreen, a memory, and one or more processors configured to execute one or more programs stored in the memory, and the graphical user interface includes a first display area of the touchscreen and a plurality of running application programs that are stacked for displaying in the first display area, where in response to a first input detected by the touchscreen for the first display area, an application program that is reachable by the first input in an input position corresponding to the first input is displayed, where the application program that is reachable by the first input in the input position corresponding to the first input is determined according to the input position and non-position information corresponding to the first input in the input position.

The following describes manners of displaying the reachable application program.

With reference to the second aspect, in some embodiments, the reachable application programs are displayed separately in N sub display areas included in the first display area, where a sub display area displays content correspondingly output by a reachable application program in the sub display area, and a sub display area corresponding to a reachable $i^{th}$-layer application program is nested in a periphery of a sub display area corresponding to a reachable $(i+1)^{th}$-layer application program; where i<N, i is a positive integer, and N is a quantity of the application programs that are reachable by the first input in the input position.

With reference to the second aspect, in some embodiments, only a bottom-layer application program that is reachable by the first input in the input position may be displayed in the first display area.

In the embodiments of the present invention, the first input may change in real time, or may be released.

With reference to the second aspect, in some embodiments, the graphical user interface further includes: in response to a detected change of the input position corresponding to the first input, displaying an application program that is reachable by the first input in a new input position.

With reference to the second aspect, in some embodiments, the graphical user interface further includes: in response to a detected increase of a numeric value of the non-position information corresponding to the first input in the input position, displaying an added reachable application program in a nested manner in a display area corresponding to the reachable bottom-layer application program.

With reference to the second aspect, in some embodiments, the graphical user interface further includes: in response to a detected decrease of a numeric value of the non-position information corresponding to the first input in the input position, canceling displaying of an application program that is no longer reachable, in a display area corresponding to an application program in a layer above the application program that is no longer reachable.

With reference to the second aspect, in some embodiments, the graphical user interface further includes: in response to detected releasing of the first input, keeping displaying the reachable application program in the first display area within a specified delay time.

Specifically, the graphical user interface further includes: in response to a detected second input for the first display area, adjusting a display status of the reachable application program in the first display area within the specified delay time.

According to a third aspect, a terminal is provided and includes a touchscreen and a processor, where the touchscreen is configured to stack a plurality of running application programs for displaying, and detect a first input for the application programs;

the processor is configured to obtain an input position corresponding to the first input and non-position information corresponding to the first input in the input position;

the processor is configured to determine, according to the input position and the non-position information, an application program that is reachable by the first input in the input position, and instruct the touchscreen to display the reachable application program; and the touchscreen is configured to display the application program that is reachable by the first input in the input position.

With reference to the third aspect, in some embodiments, the non-position information is touch pressure. The terminal further includes a pressure sensor disposed under the touchscreen. The pressure sensor is configured to detect touch pressure of the first input in the input position. The processor obtains the touch pressure of the first input in the input position by using the pressure sensor.

With reference to the third aspect, in some embodiments, the non-position information is touch duration. The terminal further includes a timer. The timer is configured to detect touch duration of the first input in the input position. The processor obtains the touch duration of the first input in the input duration by using the timer.

With reference to the third aspect, in some embodiments, the non-position information is a touch area. The touchscreen is configured to detect a touch area of the first input in the input position. The processor obtains the touch area by using the touchscreen.

It should be noted that, for implementations of functions of the processor and the touchscreen, reference may also be made to the method described in the first aspect.

According to a fourth aspect, a terminal is provided and includes functional units configured to perform the method in the first aspect.

According to a fifth aspect, a readable non-volatile storage medium storing a computer instruction is provided, where a terminal device having a touchscreen executes the computer instruction to implement the method described in the first aspect.

In implementations of the method embodiments of the present invention, the input position and the non-position information corresponding to the user operation (namely, the first input) used to view the stacked application programs are obtained, the application program that is reachable by the first input in the input position is determined according to the input position and the non-position information, and finally, the reachable application program is displayed in the user interface. The solutions can simplify an operation of viewing a blocked application program in the stacked application programs by the user.

BRIEF DESCRIPTION OF DRAWINGS

To describe the technical solutions in the embodiments of the present invention more clearly, the following briefly describes accompanying drawings used in the description of the embodiments.

DESCRIPTION OF EMBODIMENTS

Terms used in implementations of the present invention are used only to explain specific embodiments of the present invention, and not to limit the present invention.

To help understand the embodiments of the present invention, the following first describes an application scenario in the embodiments of the present invention: stacked application programs (stacked applications).

Figures 1A, 1B, 1C:
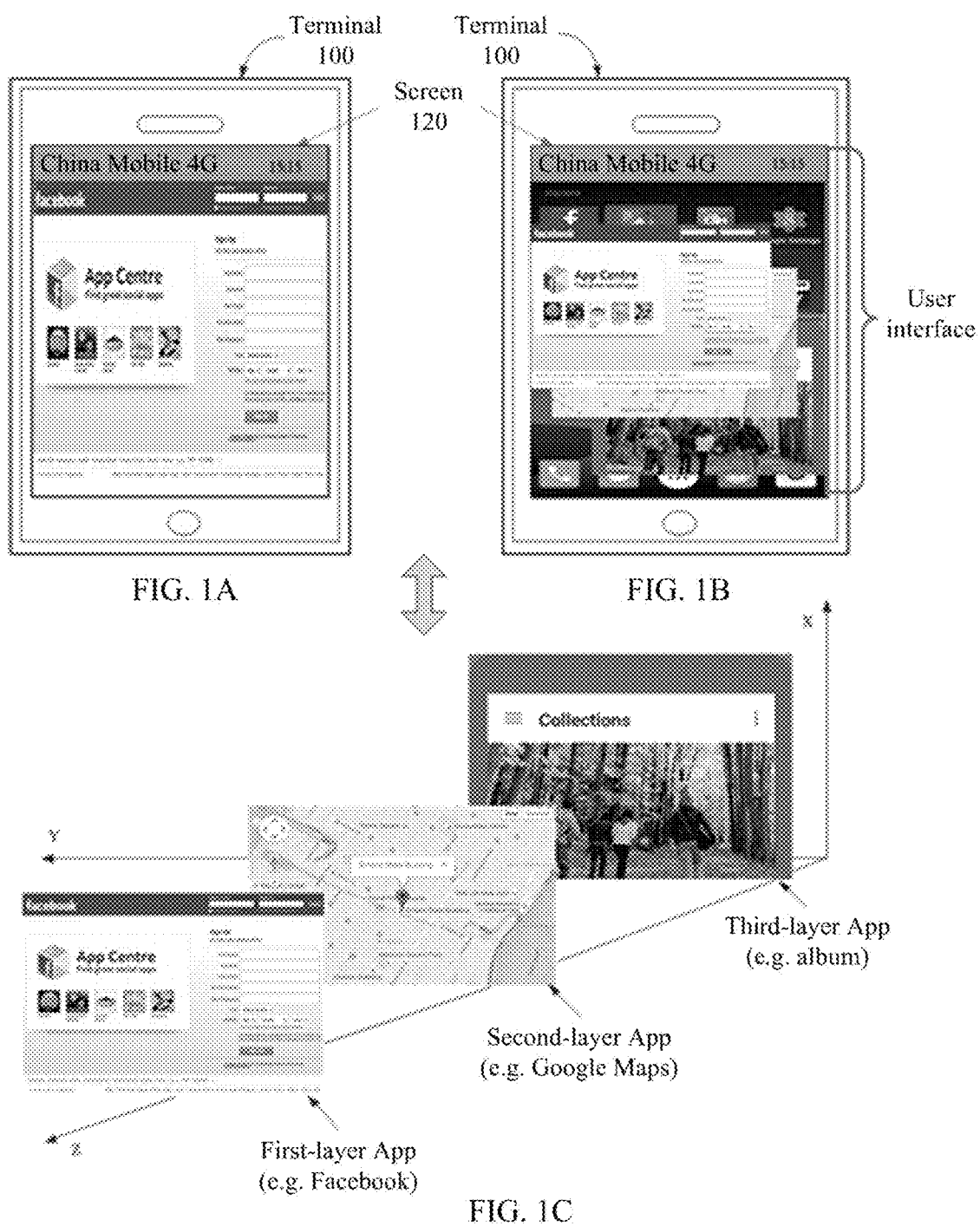
FIG. 1A to FIG. 1C are schematic diagrams of stacked application programs according to an embodiment of the present invention.

FIG. 1A to FIG. 1C are schematic diagrams of stacked application programs according to an embodiment of the present invention. As shown in FIG. 1A to FIG. 1C, a plurality of application programs simultaneously run on a terminal 100, and may be as follows: a social application program, for example, Facebook (English: Facebook); an image management application program, for example, an album; a map application program, for example, Google Maps; and a browser, for example, Safari or Google Chrome. However, at a time, a screen 120 of the terminal 100 can completely display content of only one application program, for example, Facebook. In this embodiment of the present invention, this application program is referred to as a top-layer application program, namely, a first-layer application program, first-layer App for short. Other running application programs, for example, Google Maps and the album, are blocked by the top-layer application program and stacked under the top-layer application program, and cannot be viewed by a user conveniently. Usually, the terminal 100 maintains a data structure, for example, a stack, for storing a mutually stacking structure of the running application programs. In this embodiment of the present invention, the application programs having this mutually stacking structure are referred to as stacked application programs. For each of the stacked application programs, there is an immediately higher layer application (except the top-layer application) and an immediately lower layer application (except a bottom-layer application). In addition, each application is blocked by its immediately higher layer application.

Stacking manners represented by the stacked application programs may include two manners. In a first manner, the higher layer application completely blocks the lower layer application, as shown in FIG. 1A. In a second manner, the higher layer application partly blocks the lower layer application, as shown in FIG. 1B. The case shown in FIG. 1B is more common in an embodiment in which the terminal 100 has a relatively large screen 120. For example, the terminal 100 is a tablet computer.

As shown in FIG. 1C, a z-axis represents a coordinate axis vertical to the screen. The application programs simultaneously running on the terminal 100 have a stacking structure along the z-axis according to a stacking order. Google Maps and the album are respectively located in a second layer and a third layer and blocked by the top-layer application Facebook, and cannot be viewed by the user conveniently. Usually, the stacking order between the stacked application programs may be related to an activation time sequence of the application programs. For example, a last activated application program is usually located in the top layer. Herein, activation of an application program may be triggered by an action such as starting the application program or actively operating the application program, or may be triggered by an internal event of the application program, for example, a download completion report event. It should be noted that, another policy may also be used to determine the stacking order between the stacked application programs. This is not limited in this embodiment of the present invention.

It should be noted that, FIG. 1A to FIG. 1C are merely examples of the stacked application programs in this embodiment of the present invention, and shall not be construed as limitations. In an actual application, a quantity of stacked application programs may be greater or less than three shown in FIG. 1A to FIG. 1C. The stacked application programs and the stacking order are not limited by FIG. 1A to FIG. 1C The following describes a user interface (UI: User Interface) and a user operation embodiment used to view stacked application programs in an embodiment of the present invention.

Figure 2:
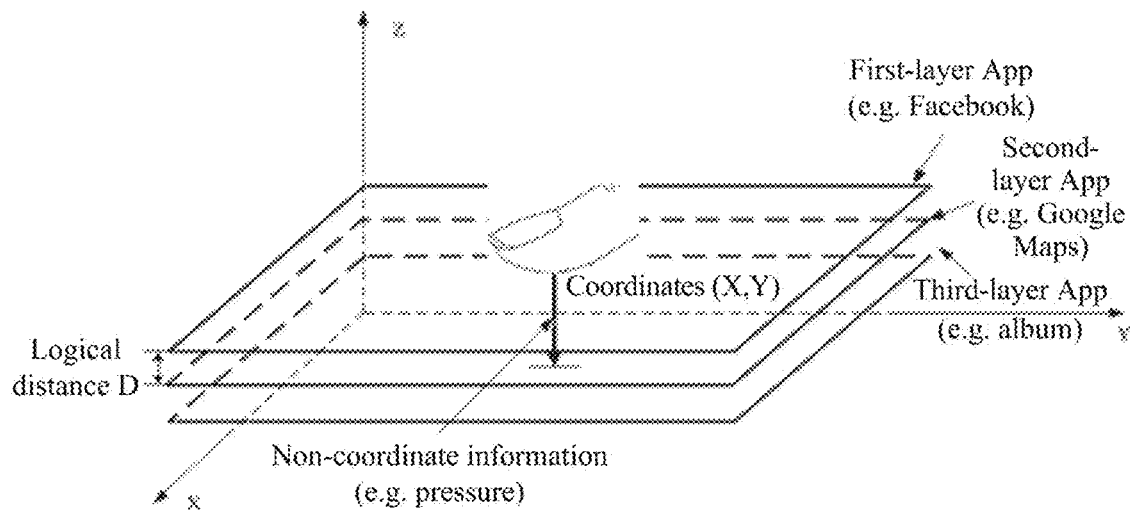
FIG. 2 to FIG. 9 are schematic diagrams of user interfaces and some embodiments for implementing operations used to view stacked application programs in the user interfaces according to embodiments of the present invention.

FIG. 2 is a schematic diagram of a user operation used to view stacked application programs according to an embodiment of the present invention. In this embodiment of the present invention, the user operation used to view the stacked application programs is referred to as a first input.

As shown in FIG. 2, the first input may be a touch operation. To avoid a wrong touch, the first input is usually applied to a position in which no response action is defined in a user interface. Herein, a position in which a response action is defined is a touch position in which a predefined function can be triggered by a touch operation, for example, a touch position of a shortcut of an application program or a touch position of a control such as a key.

In the user interface, when a system detects the first input, the system may obtain information in two aspects, coordinates and non-coordinate information. The coordinates are an input position corresponding to the first input, and may specifically represent an approximate position in which a user wants to view content output by the stacked application programs. The non-coordinate information is non-position information corresponding to the first input in the input position, and specifically may be information about touch pressure, touch duration, a touch area, or the like. In response to the first input, the system may display content correspondingly output by one or more of the stacked application programs near the coordinates in the user interface. The coordinates and the non-coordinate information may determine which application programs in the stacked application programs can be displayed in the user interface.

For brevity of description, a concept is introduced in this embodiment of the present invention: an application program that is reachable (attainable) by the first input in a position of the coordinates. Herein, the first input may be compared to a "probe", and the touch pressure may be expressed as a vertical touch depth of the "probe". Visually, the application program that is reachable by the first input in the position of the coordinates may be similarly considered as an application program that can be touched downward by the "probe" in the position of the coordinates. It should be understood that, if the touch pressure is greater, a downward touch depth of the "probe" is greater, and more application programs are reachable by the first input in the position of the coordinates.

As shown in FIG. 2, a first-layer application program that is touchable by the first input in the position of the coordinates is Facebook. If the touch pressure corresponding to the first input is sufficiently great, the application programs that are reachable by the first input in the position of the coordinates may further include Google Maps, or may further include Google Maps and an album.

In this embodiment of the present invention, the application programs that are reachable by the first input in the position of the coordinates are application programs that the system determines to display in the user interface. For details about how to display the reachable application programs in the user interface, refer to subsequent content. The following first describes how to determine a quantity of the application programs that are reachable by the first input in the position of the coordinates.

As shown in FIG. 2, it is assumed that a logical distance between application programs in two adjacent layers is D. Herein, the logical distance is used to measure the quantity of the application programs that are reachable by the first input in the position of the coordinates. In this embodiment of the present invention, a function f(Q/D) may be used to represent the quantity N of the application programs that are reachable by the first input in the position of the coordinates. Q represents a numeric value of the non-coordinate information corresponding to the first input, for example, the touch pressure.

In a specific implementation, the function f may be a linear function. For example, $N=f(Q/D)=\theta*(Q/D)(\theta>0)$. Simply, when $\theta=1$, every time touch pressure Q increases by a numeric value D, a lower layer application program that is reachable by the first input is added. This example is merely an implementation of this embodiment of the present invention. In an actual application, the function f may also be a linear function in another form. This is not limited herein. In some possible embodiments, the function f may also be a non-linear function. That is, there is no linear change relationship between the touch pressure and the quantity of the application programs that are reachable by the first input.

In this embodiment of the present invention, the first input may change in real time. In a specific implementation, the system may perform, at regular intervals, for example, 10 microseconds, sampling on the coordinates and the non-coordinate information corresponding to the first input. If there is a difference between sampled data at a sampling time T and sampled data at a sampling time T+1, and the difference exceeds a sufficiently notable threshold, it is considered that the first input changes. Otherwise, it is considered that the first input does not change. In an actual application, the notable threshold (coordinates or non-coordinate information) may be determined according to a system configuration or the like of a terminal device. This is not limited in this embodiment of the present invention.

Specifically, the real-time change of the first input may include the following two cases or a combination of the following two cases.

1. The coordinates of the first input change, and this change may be used to change a viewing position. For example, coordinates of the first input at the sampling time T are (20, 20), and coordinates of the first input at the sampling time T+1 are (30, 30). The user changes from originally viewing content output by an application program in a position of coordinates (20, 20) to viewing content output by an application program in a position of coordinates (30, 30).

2. The non-coordinate information of the first input changes, and this change may be used to change a quantity of application programs that the user can view. For example, as shown in FIG. 2, if the touch pressure of the first input increases, a quantity of application programs that the user can view in a position of coordinates (X, Y) increases.

In particular, if the system can obtain sampled data at the sampling time T, but cannot obtain sampled data at the sampling time T+1, it is considered that the first input is released (released) at the sampling time T+1. Herein, if the first input is a touch operation, that the first input is released may be that a touch point such as a finger leaves a touchscreen of a terminal.

It should be noted that, the first input may also be a gesture operation, without being limited to the touch operation shown in FIG. 2. Correspondingly, the non-coordinate information corresponding to the first input may be a gesture depth. That the first input is released may be that a hand portion such as a finger or an arm of the user leaves a sensing range of a gesture sensor of the terminal. In an actual application, the first input may also be an input operation of another type. This is not limited herein.

FIG. 3A to FIG. 3D and FIG. 4A and FIG. 4B show some embodiments for implementing the first input in a user interface by a user. For ease of description, in subsequent content, a screen 120 is a touchscreen, a touch operation is used as an example of the first input, and touch pressure is used as an example of non-coordinate information of the first input.

FIG. 3A to FIG. 3D are an embodiment of a user interface for implementing the first input for stacked application programs in a first stacking form. The first stacking form is that a higher layer application completely blocks a lower layer application.

As shown in FIG. 3A to FIG. 3D, the user interface may include a first display area 10 of a screen 120 and stacked application programs in the first display area 10. From top to bottom, the stacked application programs in the first display area 10 in FIG. 1A to FIG. 1C include Facebook, Google Maps, and an album. The first display area 10 may occupy the entire screen 120, or may occupy a part of the screen 120, for example, a split-screen application.

Figure 3A:
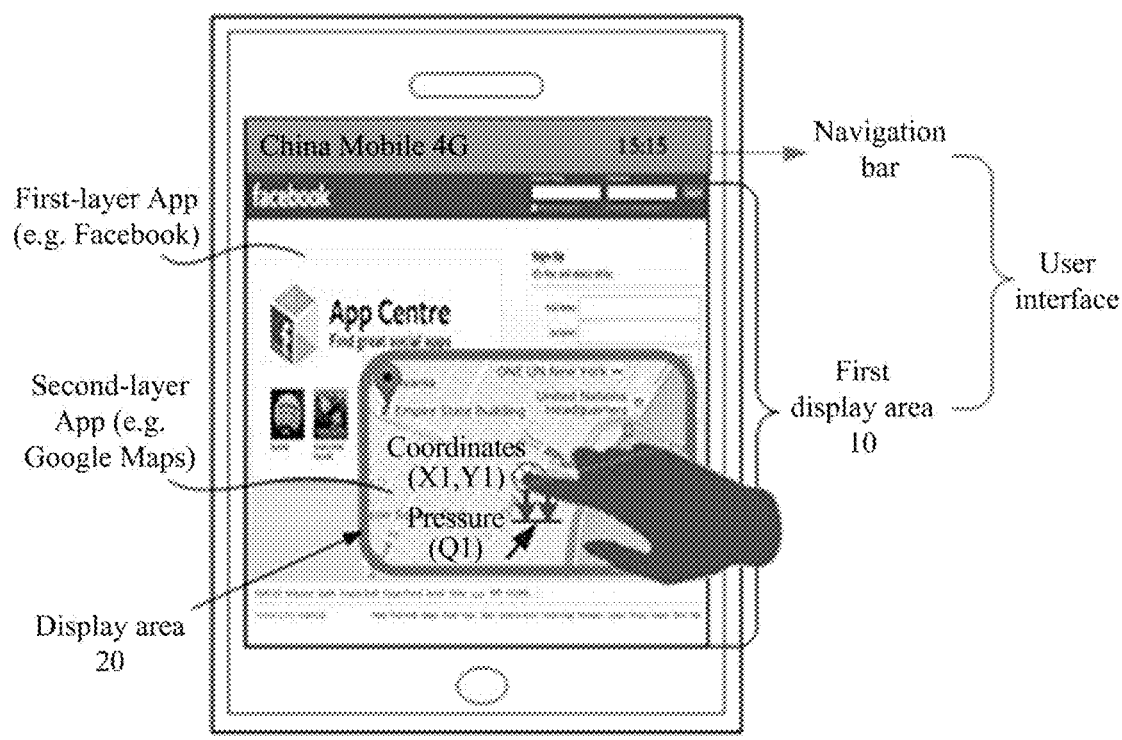

As shown in FIG. 3A, on the screen 120, a system detects the first input. Coordinates of the first input are (X1, Y1). Touch pressure corresponding to the first input is Q1. The system may determine, according to the coordinates (X1, Y1) and the touch pressure Q1, that application programs that are reachable by the first input in a position of the coordinates (X1, Y1) are Facebook and Google Maps. Facebook is a first-layer application program that is reachable by the first input in the position of the coordinates.

The following describes in detail how to display a reachable deep layer application program in the user interface in response to the first input. Herein, the reachable deep layer application program is relative to the reachable first-layer application program, and is a lower layer application program blocked by the first-layer application program.

As shown in FIG. 3A, in response to the first input, a new display area, namely, a display area 20, for displaying a second-layer application program that is reachable by the first input in the position of the coordinates (X1, Y1), namely, Google Maps, is created in the first display area 10 by using the coordinates (X1, Y1) of the first input as a center.

Figure 3B:
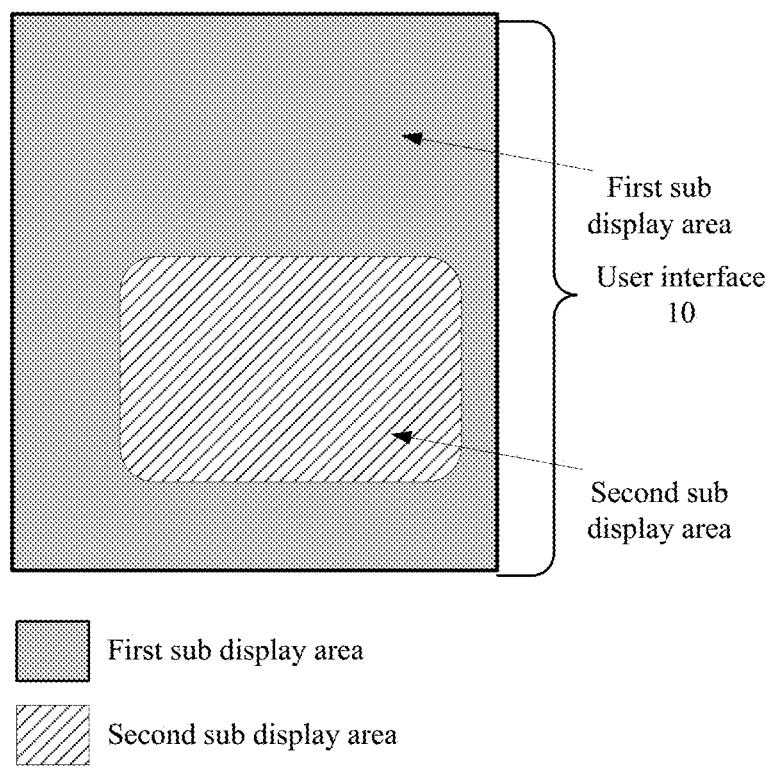

It should be understood that, the following change occurs in the user interface in this case. As shown in FIG. 3B, the first display area 10 is divided into two sub display areas: a first sub display area and a second sub display area. The first sub display area is nested in a periphery of the second sub display area. The first sub display area is used to display content correspondingly output by the reachable first-layer application program, namely, Facebook, in the first sub display area. The second sub display area is used to display content correspondingly output by the reachable second-layer application program, namely, Google Maps, in the second sub display area. Herein, the second sub display area is the new display area 20.

Figure 3C:
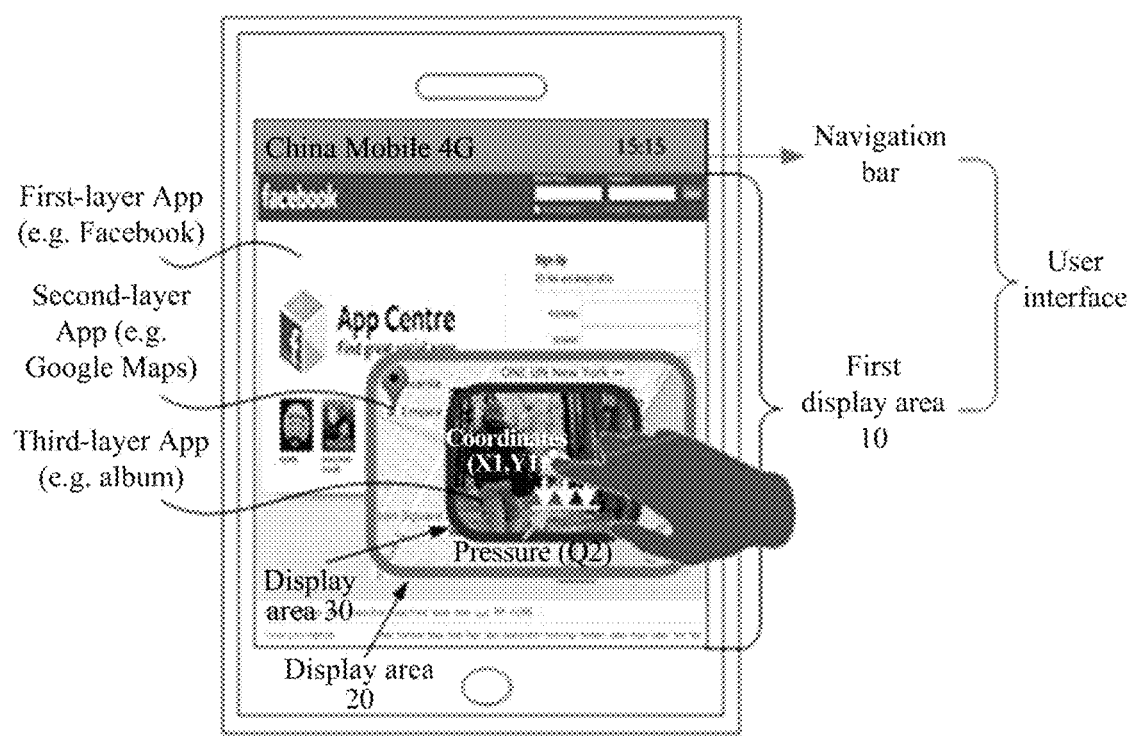

As shown in FIG. 3C, the coordinates of the first input do not change, and are still (X1, Y1). However, the touch pressure corresponding to the first input increases to Q2, and application programs that are reachable by the first input in the position of the coordinates (X1, Y1) increase to Facebook, Google Maps, and the album. In this case, in response to the first input with the increased touch pressure, a new display area, namely, a display area 30, for displaying a third-layer application program that is reachable by the first input in the position of the coordinates (X1, Y1), namely, the album, is further created in the display area 20 by using the coordinates (X1, Y1) as a center.

Figure 3D:
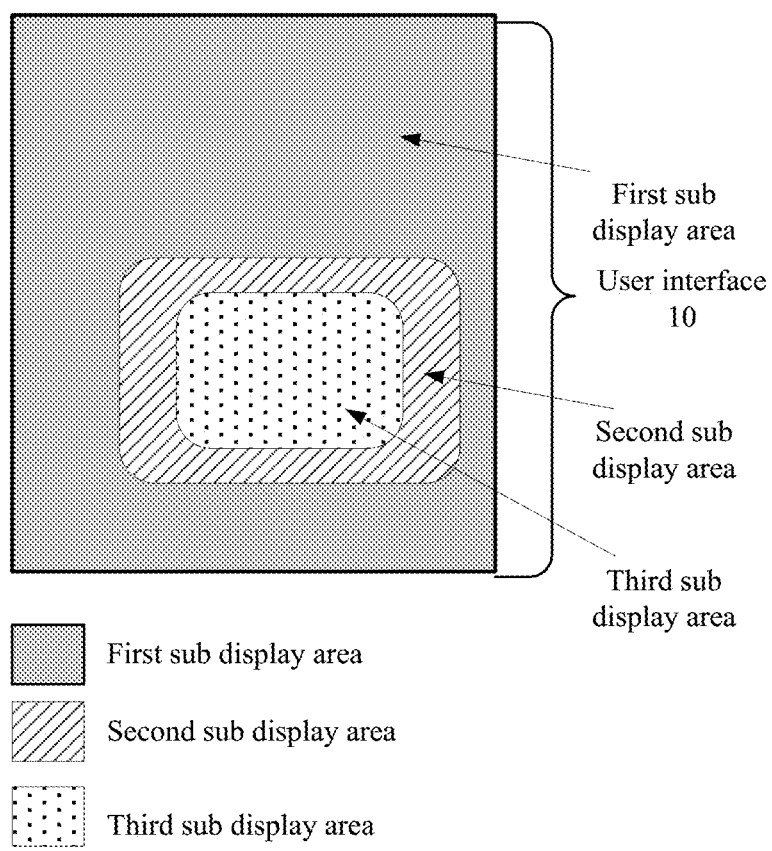

It should be understood that, the following change occurs in the user interface in this case. As shown in FIG. 3D, the first display area 10 is further divided into three sub display areas: the first sub display area, the second sub display area, and a third sub display area. The second sub display area is nested in a periphery of the third sub display area, and the first sub display area is nested in the periphery of the second sub display area. The first sub display area is used to display the content correspondingly output by the reachable first-layer application program, namely, Facebook, in the first sub display area. The second sub display area is used to display the content correspondingly output by the reachable second-layer application program, namely, Google Maps, in the second sub display area. The third sub display area is used to display content correspondingly output by the reachable third-layer application program, namely, the album, in the third sub display area. Herein, the third sub display area is the new display area 30.

By analogy, if a still lower layer application program is reachable by the first input in the position of the coordinates (X1, Y1), a display area may be created in the display area 30 corresponding to the reachable third-layer application program, namely, the album, and a reachable fourth-layer application program is displayed in the new display area. This process is repeated, until all reachable deep layer application programs are displayed. Finally, all the reachable deep layer application programs are displayed in a nested manner in the first display area 10 according to a stacking order. That is, the first display area 10 is divided into more sub display areas that are used to display the reachable application programs separately.

In this embodiment of the present invention, the method for displaying reachable application programs, described in the foregoing process, may be visually referred to as a nested displaying method. The nested displaying method may be summarized as follows: The reachable application programs are displayed separately in N sub display areas included in the first display area, where a sub display area displays content correspondingly output by a reachable application program in the sub display area, and a sub display area corresponding to a reachable $i^{th}$-layer application program is nested in a periphery of a sub display area corresponding to a reachable $(i+1)^{th}$-layer application program; where i<N, i is a positive integer, and N is a quantity of the application programs that are reachable by the first input in the input position.

In this embodiment of the present invention, content correspondingly output by a reachable application program in a display area, for example, the display area 20, is content output by the reachable application program in a coordinate range of the display area. For example, it is assumed that a coordinate range covered by the second sub display area in FIG. 3B is [(20, 20), (120, 100)], where (20, 20) indicate coordinates of an upper left corner of the second sub display area, and (120, 100) indicate coordinates of a lower right corner of the second sub display area. In this case, the content corresponding output by Google Maps in the second sub display area is content output by Google Maps in a rectangular area defined by the coordinate range [(20, 20), (120, 100)]. This example is merely used to explain this embodiment of the present invention, and shall not be construed as a limitation.

In this embodiment of the present invention, the system refreshes, in real time, content correspondingly output by each reachable deep layer application program in a display area corresponding to the application program. For example, as shown in FIG. 3C, if a video clip is being played in the album, content displayed in the third sub display area is synchronous with the video playing. This example is merely used to explain this embodiment of the present invention, and shall not be construed as a limitation.

Figure 4A:
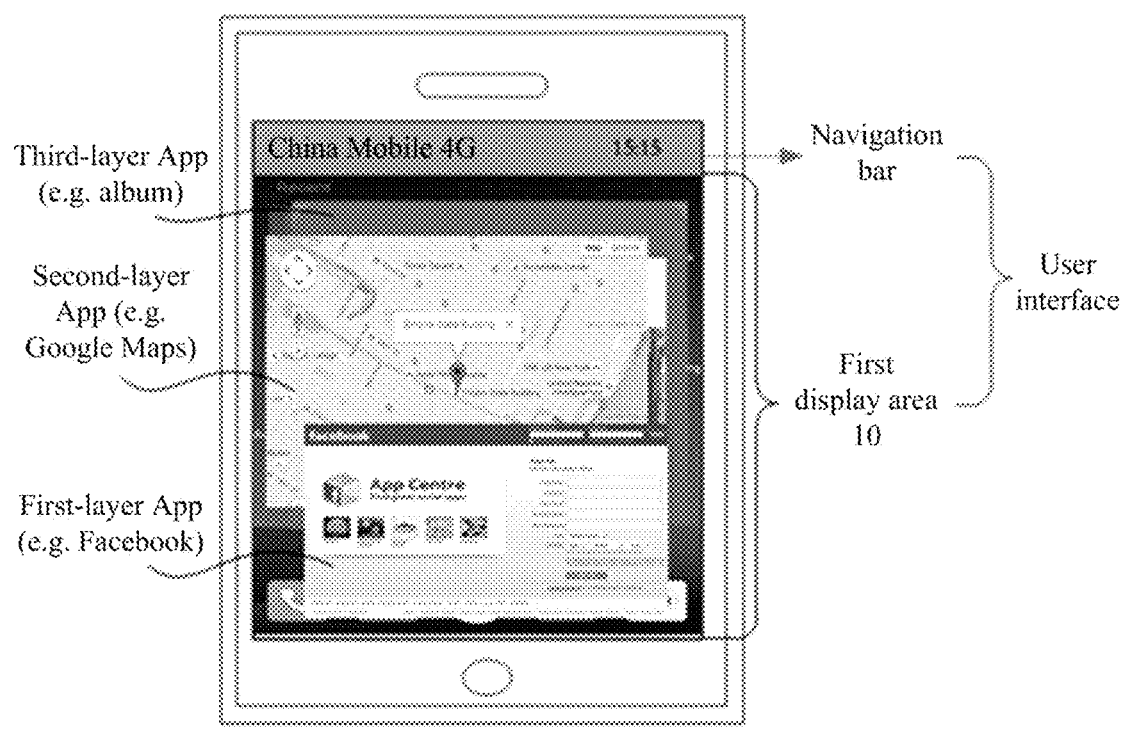
Figure 4B:
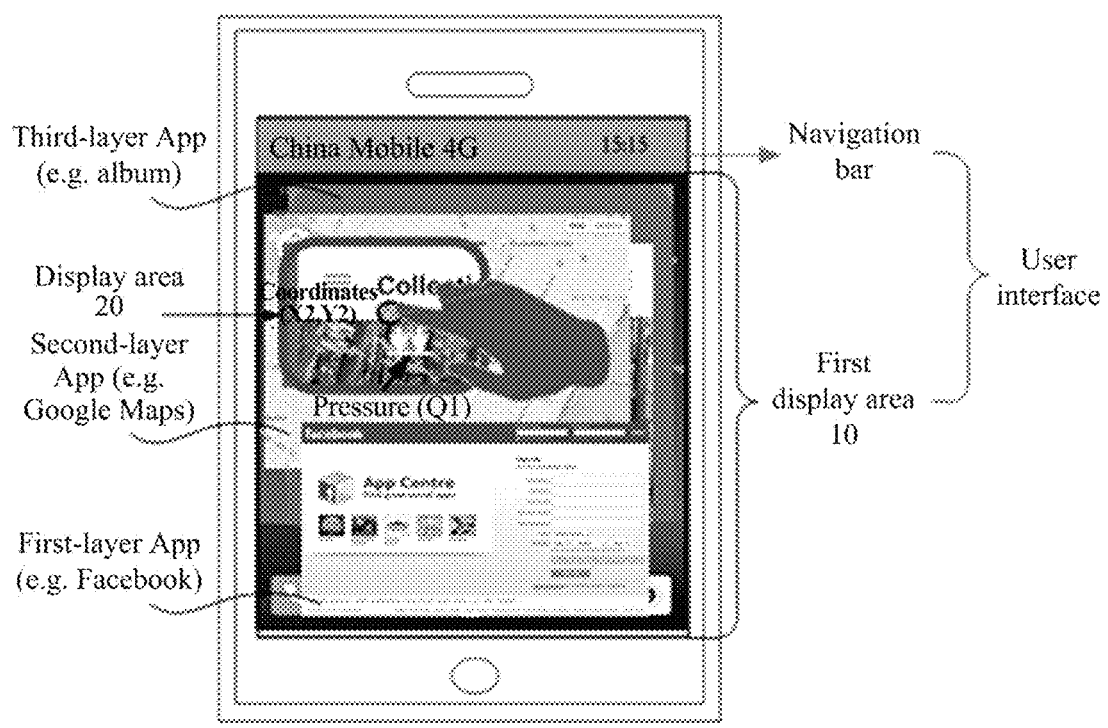

FIG. 4A and FIG. 4B are an embodiment of a user interface for implementing the first input for stacked application programs in a second stacking form. The second stacking form is that a higher layer application partly blocks a lower layer application, as shown in FIG. 4A.

As shown in FIG. 4A and FIG. 4B, the user interface may include a first display area 10 of a screen 120 and stacked application programs in the first display area 10. From top to bottom, the stacked application programs in the first display area 10 in FIG. 1A to FIG. 1C include Facebook, Google Maps, and an album. The first display area 10 may occupy the entire screen 120, or may occupy a part of the screen 120, for example, a split-screen application.

As shown in FIG. 4B, on the screen 120, a system detects the first input. Coordinates of the first input are (X2, Y2). Touch pressure corresponding to the first input is Q1. The system may determine, according to the coordinates (X2, Y2) and the touch pressure Q1, that application programs that are reachable by the first input in a position of the coordinates (X2, Y2) are Google Maps and the album. Google Maps is a first-layer application program that is reachable by the first input in the position of the coordinates (X2, Y2).

As shown in FIG. 4B, in response to the first input, the following change occurs in the user interface: A deep layer application program that is reachable by the first input in the position of the coordinates (X2, Y2), namely, the album, is displayed in the first display area 10. Specifically, a new display area, namely, a display area 20, is created in the first display area 10 by using the coordinates (X2, Y2) as a center, and the album is displayed in the display area 20.

It may be understood that, if a still lower layer application program is reachable by the first input in the position of the coordinates (X2, Y2), the still lower layer application program may be further displayed in a nested manner in the display area 20. For a specific process of displaying the reachable application program in the nested manner, refer to content in the embodiment in FIG. 3A to FIG. 3D. Details are not further described herein.

Figure 5A:
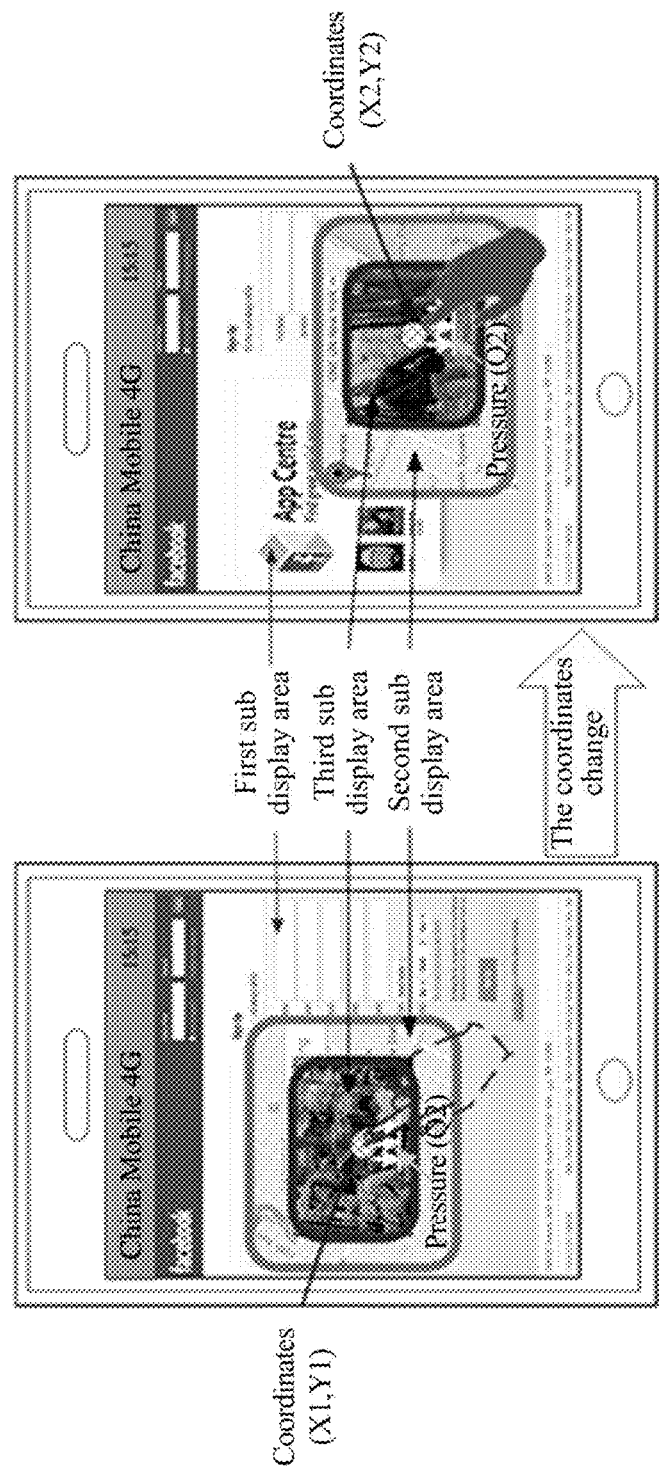
Figure 5B:
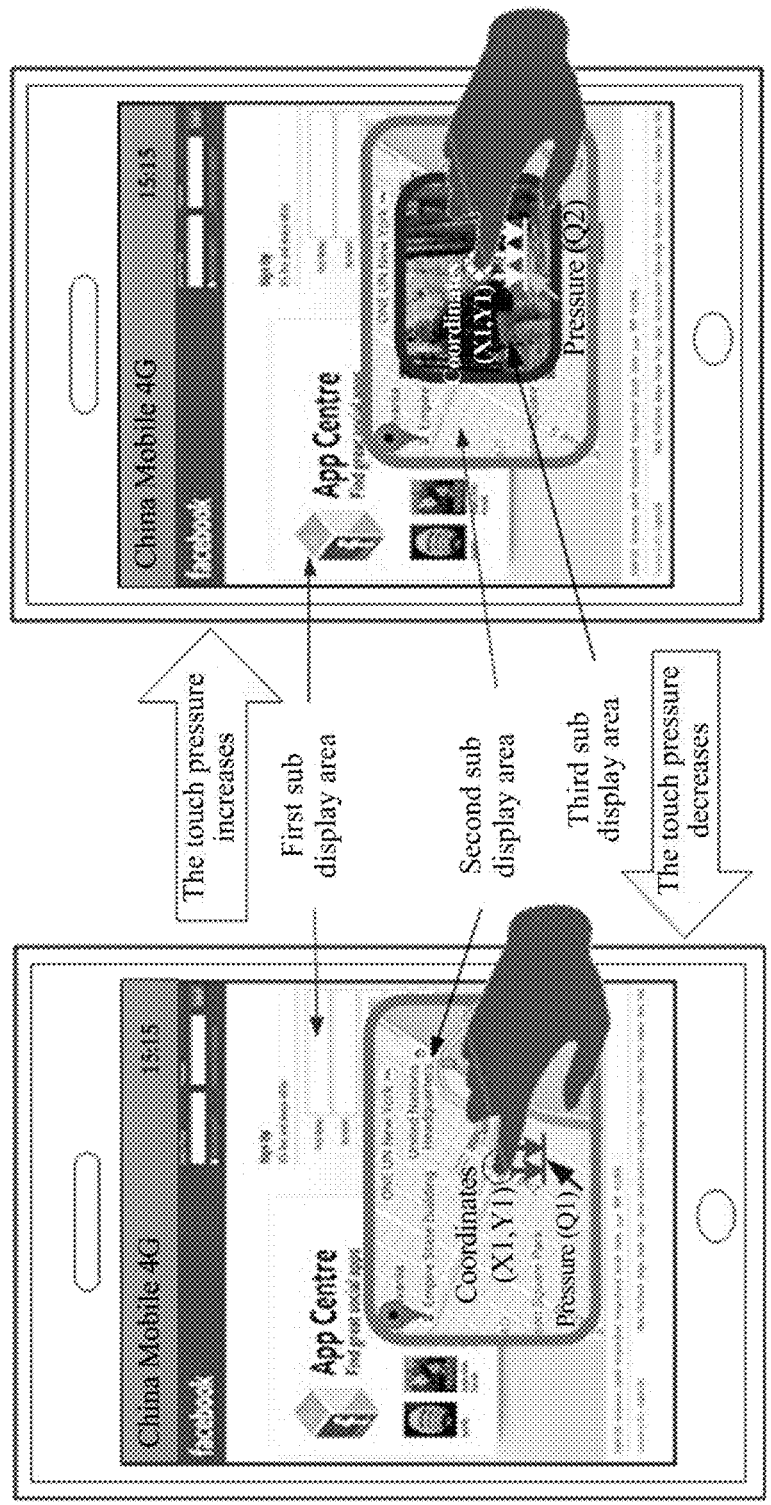

FIG. 5A and FIG. 5B are an embodiment in which the first input changes in real time.

As shown in FIG. 5A and FIG. 5B, a user interface may include a first display area 10 of a screen 120 and stacked application programs in the first display area 10. From top to bottom, the stacked application programs in the first display area 10 in FIG. 1A to FIG. 1C include Facebook, Google Maps, and an album. The first display area 10 may occupy the entire screen 120, or may occupy a part of the screen 120, for example, a split-screen application.

As shown in FIG. 5A, on the screen 120, a system detects that coordinates of the first input change from (X1, Y1) to (X2, Y2). In response to the change of the coordinates, a deep layer application program that is reachable by the first input in a position of the coordinates (X2, Y2) is redetermined, and the deep layer application program that is reachable by the first input in the position of the coordinates (X2, Y2) is displayed.

As shown in FIG. 5B, on the screen 120, the system detects that touch pressure of the first input changes. In response to the change of the touch pressure, an application program displayed in the first display area 10 may be adjusted in real time.

Specifically, if the touch pressure of the first input increases, an added deep layer application program that is reachable by the first input in the position of the coordinates is determined, and the following change occurs in the user interface: A sub display area for displaying the added reachable application program is created in a display area of a current reachable bottom-layer application program. For example, as shown in FIG. 5B, the added reachable deep layer application program is the album. In this case, a sub display area (third sub display area) for displaying the album is created in a display area (second sub display area) corresponding to the application program Google Maps in a layer above the album.

Specifically, if the touch pressure of the first input decreases, a deep layer application program (the album) that is no longer reachable by the first input in the position of the coordinates is determined, and the following change occurs in the user interface: The display area (third sub display area) corresponding to the deep layer application program that is no longer reachable is removed from the display area of the application program (Google Maps) in a layer above the deep layer application program that is no longer reachable. For example, as shown in FIG. 5B, the deep layer application program that is no longer reachable is the album. In this case, the display area (third sub display area) corresponding to the album is removed from the display area (second sub display area) corresponding to the application program Google Maps in the layer above the album.

In some possible implementations, the system may detect that the coordinates and touch pressure of the first input change simultaneously. In response to the simultaneous change of the coordinates and the touch pressure, the position for displaying the reachable application program is updated in real time, and the application program displayed in the first display area 10 is adjusted in real time.

Figure 6A:
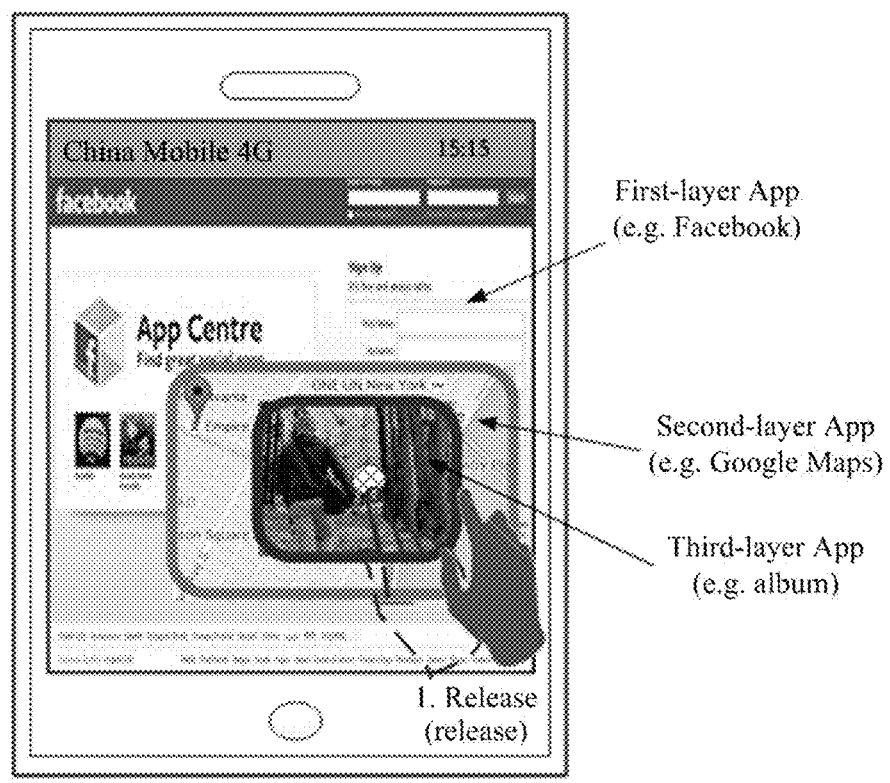
Figure 6B:
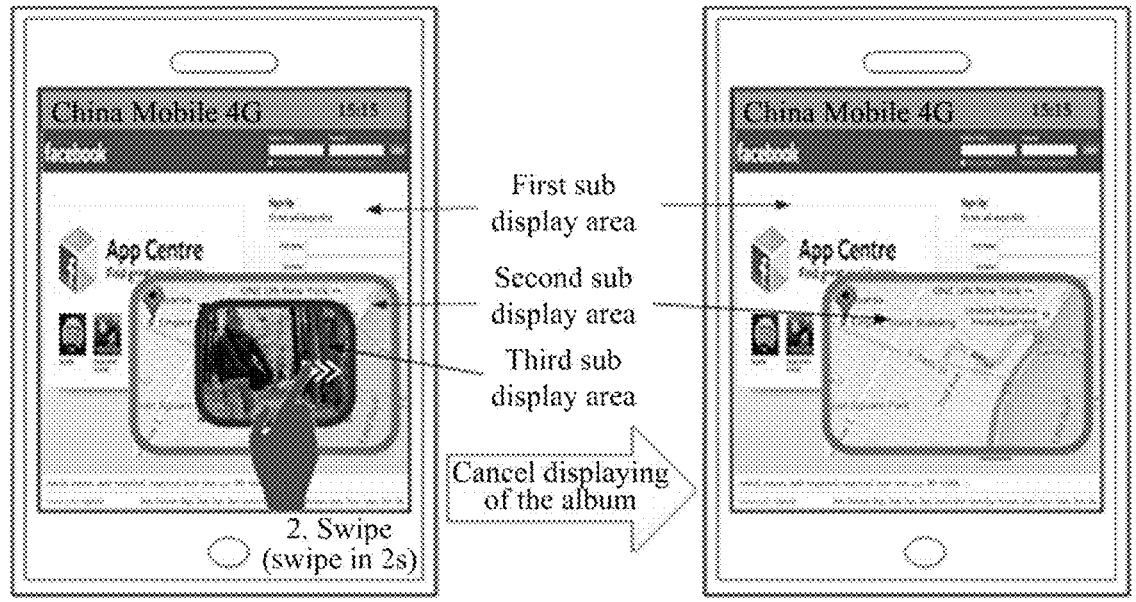
Figure 6C:
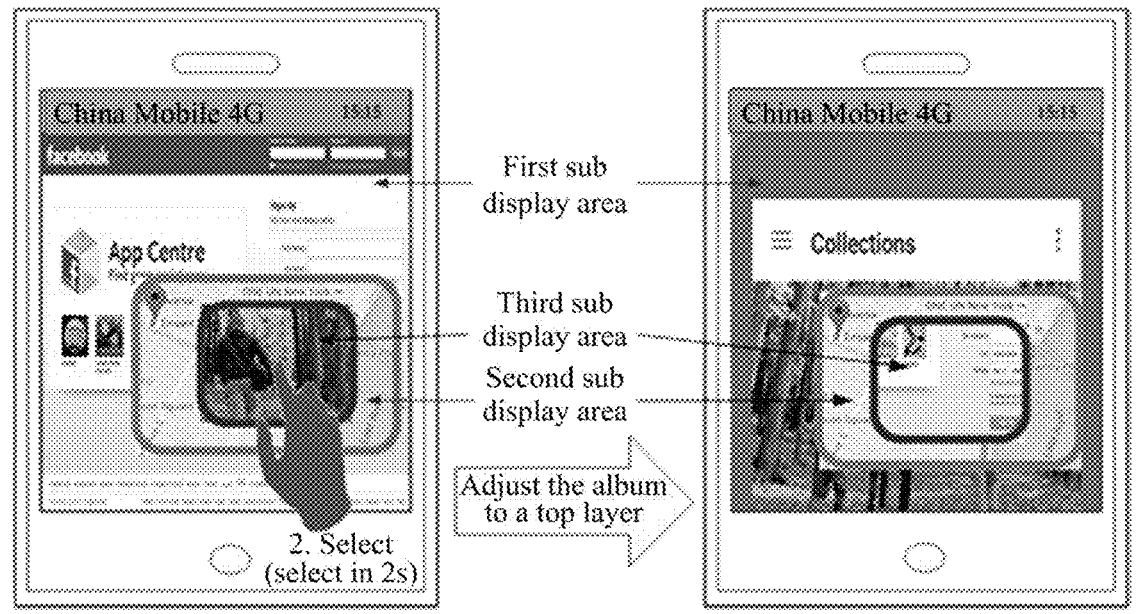

FIG. 6A to FIG. 6C are an operation embodiment in which a user releases the first input and a display status of the reachable application program in the first display area is adjusted.

As shown in FIG. 6A to FIG. 6C, a user interface includes a first display area 10 of a screen 120 and stacked application programs in the first display area 10. From top to bottom, the stacked application programs in the first display area 10 in FIG. 1A to FIG. 1C include Facebook, Google Maps, and an album. The first display area 10 may occupy the entire screen 120, or may occupy a part of the screen 120, for example, a split-screen application.

As shown in FIG. 6A, on the screen 120, a system detects releasing of the first input. For the definition and description about releasing of the first input, refer to the foregoing content. Details are not further described herein. In response to releasing of the first input, displaying the reachable application program in the first display area 10 is kept within a specified delay time after the first input is released, for example, two seconds, that is, there is no change in the user interface within the specified delay time. After the specified delay time arrives, displaying of the reachable application program is canceled.

As shown in a left drawing in FIG. 6B, on the screen 120, within the specified delay time, for example, two seconds, the system detects a swipe operation for the first display area 10, and an object to which the swipe operation is applied is a display area corresponding to the album. In response to the swipe operation, the following change occurs in the user interface: As shown in a right drawing in FIG. 6B, the display area (third sub display area) corresponding to the album is removed from a display area (second sub display area) corresponding to an application program Google Maps in a layer above the album. It can be seen that, an operation effect corresponding to the swipe operation is to cancel displaying of an application program in the reachable application programs.

As shown in a left drawing in FIG. 6C, on the screen 120, within the specified delay time, for example, two seconds, the system detects a selection operation for the first display area 10, for example, a tap operation, and an object to which the selection operation is applied is the display area corresponding to the album. In response to the swipe operation, the following change occurs in the user interface: As shown in a right drawing in FIG. 6C, the album is adjusted to a top-layer application program in the first display area 10, and an original top-layer application program Facebook is adjusted to any layer, for example, the layer in which the album is located. It can be seen that, an operation effect corresponding to the selection operation is to adjust an application program in the reachable application programs to a top layer for displaying.

To distinguish from the first input, in this embodiment of the present invention, the operation used to adjust the display status of the reachable application program in the first display area within the specified delay time is referred to as a second input. It should be noted that, the second input and the operation effect corresponding to the second input are not limited to the foregoing embodiment, and may be further set according to an actual requirement in an actual application. This is not limited herein.

The following further describes some optional implementations of a UI in an embodiment of the present invention.

A shape and size of a sub display area in a first display area 10 are not limited to FIG. 3A to FIG. 3D and FIG. 4A and FIG. 4B.

Figure 7A:
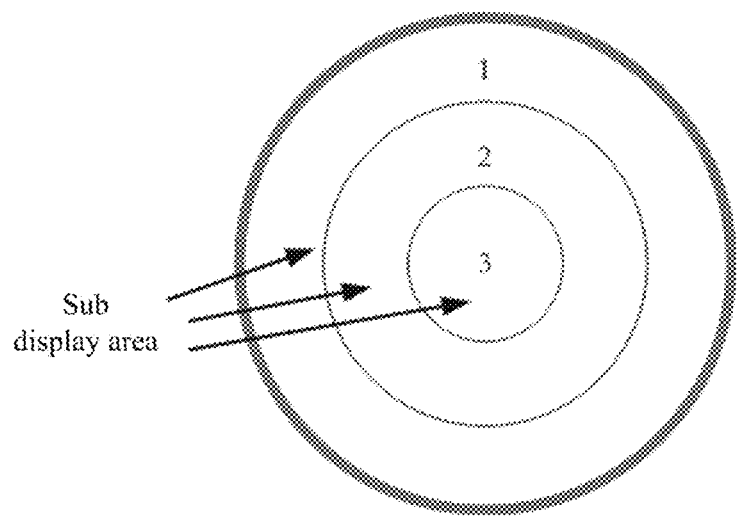
Figure 7B:
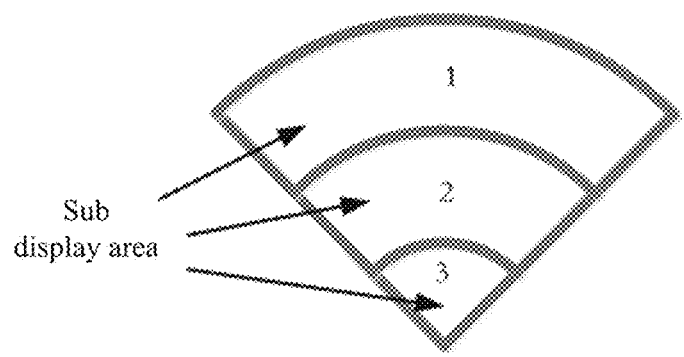

As shown in FIG. 7A, the sub display area may be a circle. As shown in FIG. 7B, the sub display area may also be a sector. A sub display area represented by a digital number may be used to display content correspondingly output by a reachable deep layer application program in the sub display area. For example, a circular sub display area "1" is used to display content correspondingly output by a second-layer application program in the circular sub display area "1". A circular sub display area "2" is used to display content correspondingly output by a third-layer application program in the circular sub display area "2". This example is merely used to explain this embodiment of the present invention, and shall not be construed as a limitation. In an actual application, the sub display area may also be in another shape not shown in the drawings. This is not limited herein.

It should be understood that, if the embodiment shown in FIG. 7A is used to display the reachable deep layer application programs, when a quantity of the reachable deep layer application programs is relatively large, because the sub display area cannot be expanded boundlessly due to a screen limitation, a width evenly allocated to each circular sub display area is very small, and consequently, it is difficult for a user to clearly see content in the circular sub display area. To resolve this problem, a sub display area is divided into a plurality of parts, and each part is used to display an application program.

Figure 7C:
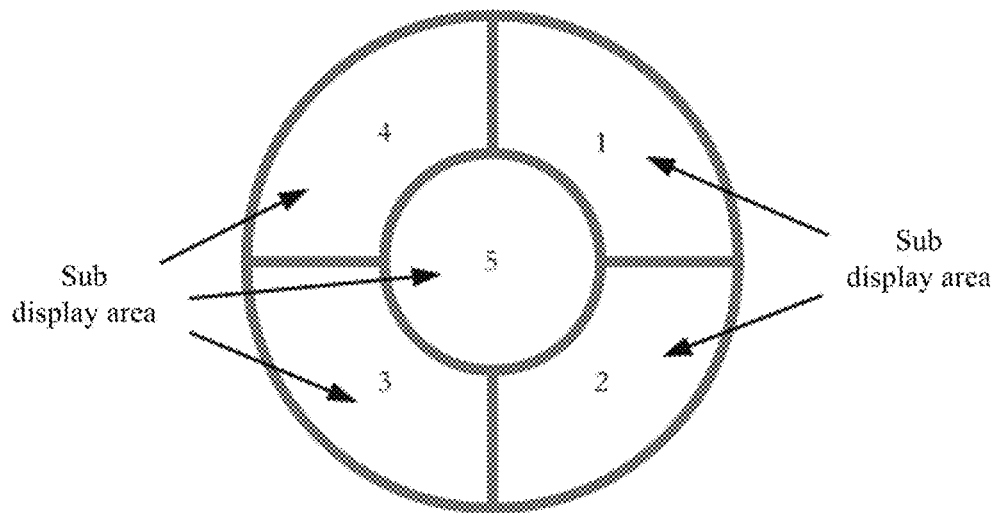

For example, as shown in FIG. 7C, a nested external-layer sub display area is divided into four parts, and each part is used to display an application program. In this way, even if the quantity of the reachable deep layer application programs is relatively large, there are not many nested layers in the sub display area, and the width of each layer can still clearly display content of a corresponding application program. FIG. 7C merely shows an implementation of this embodiment of the present invention. In an actual application, a division policy may be formulated according to a specific requirement. This is not limited herein.

Figure 8:
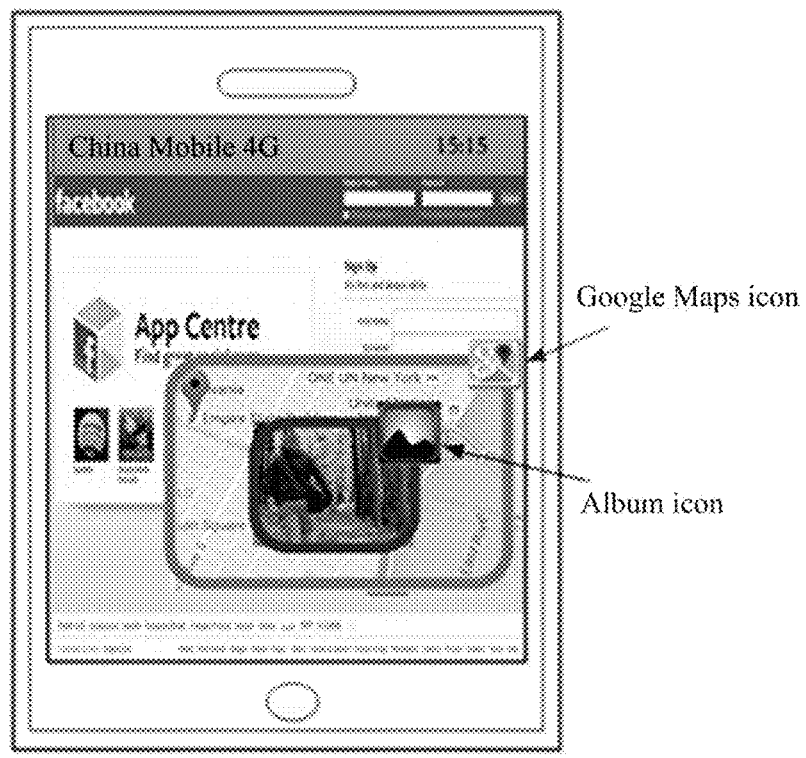

In some possible implementations, to clearly distinguish application programs displayed in sub display areas, a corresponding application icon may be set for each sub display area. For example, as shown in FIG. 8, an application icon of Google Maps is set in an upper right corner of a sub display area (second sub display area) corresponding to Google Maps, and an application icon of an album is set in an upper right corner of a sub display area (third sub display area) of the album. This example is merely used to explain this embodiment of the present invention, and shall not be construed as a limitation.

In this embodiment of the present invention, a size of the second sub display area may be a fixed value. A width of a sub display area nested in the second sub display area may be adaptively adjusted according to the quantity of the reachable deep layer application programs. Specifically, if the quantity of the reachable deep layer application programs is larger, the width of the sub display area is smaller; if the quantity of the reachable deep layer application programs is smaller, the width of the sub display area is larger.

In some possible implementations, the size of the second sub display area may also be related to a numeric value of non-coordinate information corresponding to the first input, for example, touch pressure. Specifically, if the touch pressure is greater, the second sub display area is larger.

In addition, it should be noted that, displaying the reachable application program in a nested manner by using coordinates of the first input as a center may include the following cases: If the sub display area is a rectangle, the center may be an intersecting point of two diagonal lines of the rectangle; if the sub display area is a circle or an ellipse, the center may be a center of the circle or the ellipse; or if the sub display area is a sector, the center may be a vertex of the sector. A policy for determining "the center" of the sub display area is not limited in this embodiment of the present invention.

Figure 9:
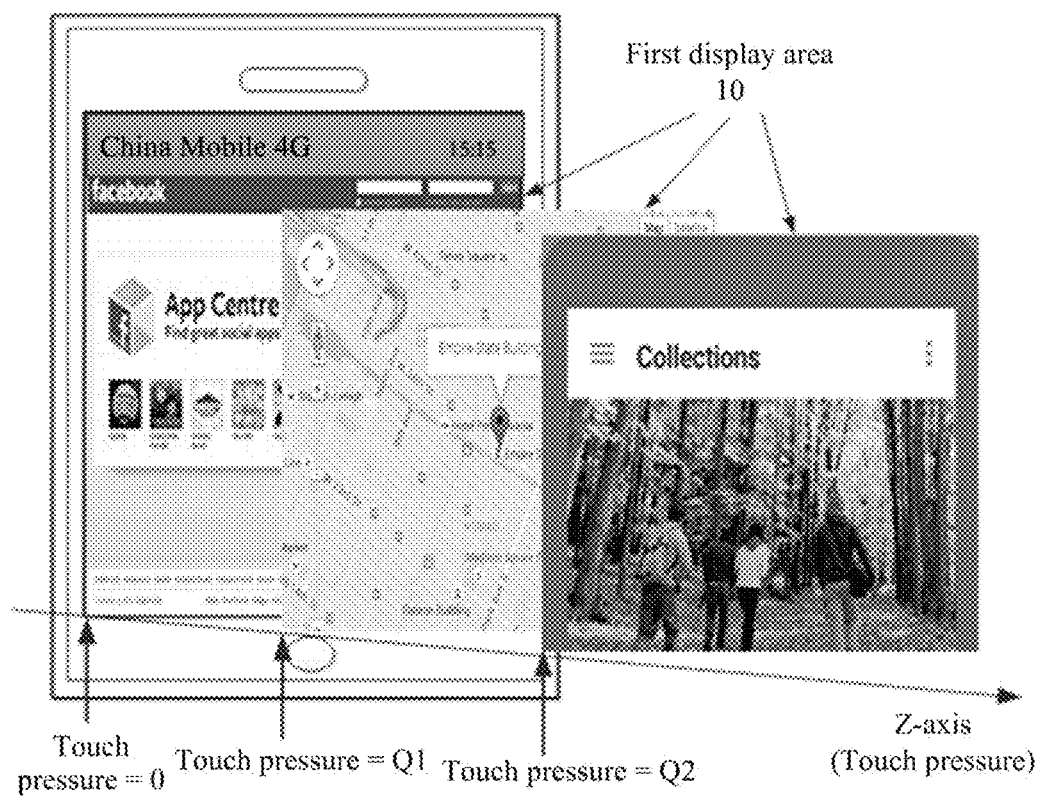

As shown in FIG. 9, in some possible implementations, the first display area 10 may be merely used to display a bottom-layer application program that is reachable by the first input in a position of the coordinates. Details are as follows:

When the touch pressure corresponding to the first input is 0, the application program that is reachable by the first input in the position of the coordinates of the first input is only Facebook. In this case, Facebook is both a reachable top-layer application and a reachable bottom-layer application. In response to the first input whose touch pressure is 0, only Facebook is displayed in the first display area 10.

When the touch pressure corresponding to the first input increases to Q1, application programs that are reachable by the first input in the position of the coordinates of the first input include Facebook and Google Maps from top to bottom. In this case, Google Maps is a reachable bottom-layer application. In response to the first input whose touch pressure is Q1, only Google Maps is displayed in the first display area 10. It should be understood that, in this case, only Google Maps in the user interface can be seen by the user.

When the touch pressure corresponding to the first input further increases to Q2, application programs that are reachable by the first input in the position of the coordinates of the first input include Facebook, Google Maps, and the album from top to bottom. In this case, the album is a reachable bottom-layer application. In response to the first input whose touch pressure is Q2, only the album is displayed in the first display area 10. It should be understood that, in this case, only the album in the user interface can be seen by the user.

By analogy, if a still lower layer application program is reachable by the first input in the position of the coordinates of the first input, only the still lower layer reachable application program may be displayed in the first display area 10. It may be understood that, if the user wants to view a still higher layer application program, the user may reduce the touch pressure corresponding to the first input.

The following describes an implementation of a terminal device in an embodiment of the present invention. The terminal device supports running of a plurality of threads, and can run a plurality of application programs or services simultaneously. Application programs supported by the terminal device may include: a social application program, for example, Facebook; an image management application program, for example, an album; a map application program, for example, Google Maps; and a browser, for example, Safari or Google Chrome. There may be a common input/output device, namely, a touchscreen, for the application programs. The touchscreen is configured to receive a touch operation of a user, and display content output by an application program. In some possible embodiments, a common input device for a plurality of application programs may also be a gesture input apparatus, for example, a gesture sensor.

Figure 10:
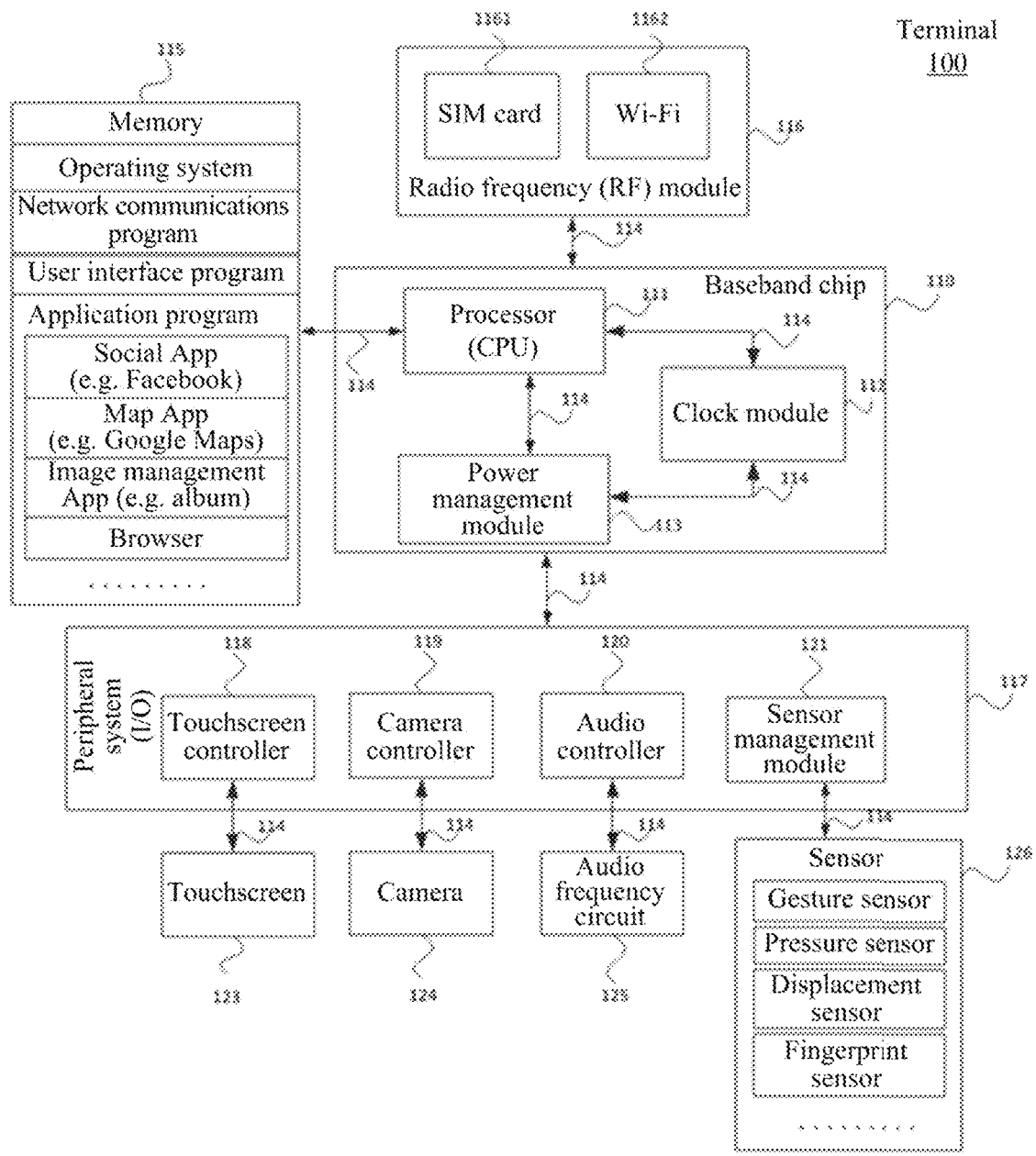
FIG. 10 is a schematic structural diagram of a terminal according to an embodiment of the present invention.

FIG. 10 is a structural block diagram of an implementation of a terminal device 100. As shown in FIG. 10, the terminal 100 may include a baseband chip 110, a memory 115 including one or more computer readable storage media, a radio frequency (RF) module 116, and a peripheral system 117. These components may communicate with each other over one or more communications buses 114.

The peripheral system 117 is mainly configured to implement an interaction function between the terminal 110 and a user or an external environment, and mainly includes an input/output apparatus of the terminal 100. In a specific implementation, the peripheral system 117 may include a touchscreen controller 118, a camera controller 119, an audio controller 120, and a sensor management module 121. Each controller may be coupled to a peripheral device corresponding to the controller, for example, a touchscreen 123, a camera 124, an audio frequency circuit 125, and a sensor 126. In some embodiments, a gesture sensor in the sensor 126 may be configured to receive a gesture control operation input by the user. A pressure sensor in the sensor 126 may be disposed under the touchscreen 123, and may be configured to capture touch pressure applied by the user on the touchscreen 123 when the user inputs a touch operation by using the touchscreen 123. It should be noted that, the peripheral system 117 may further include another I/O peripheral device.

The baseband chip 110 may include the following by integration: one or more processors 111, a clock module 112, and a power management module 113. The clock module 112 integrated in the baseband chip 110 is mainly configured to generate, for the processor 111, a clock required for data transmission and time sequence control. The power management module 113 integrated in the baseband chip 110 is mainly configured to provide a stable high-precision voltage for the processor 111, the radio frequency module 116, and the peripheral system.

The radio frequency (RF) module 116 is configured to receive and transmit radio frequency signals, and mainly includes a receiver and a transmitter of the terminal 100 by integration. The radio frequency (RF) module 116 communicates with a communications network and another communications device by using radio frequency signals. In a specific implementation, the radio frequency (RF) module 116 may include but is not limited to: an antenna system, an RF receiver, one or more amplifiers, a tuner, one or more oscillators, a digital signal processor, a CODEC chip, a SIM card, a storage medium, and the like. In some embodiments, the radio frequency (RF) module 116 may be implemented on a separate chip.

The memory 115 is coupled to the processor 111, and configured to store various software programs and/or multiple groups of instructions. In a specific implementation, the memory 115 may include a high-speed random access memory, and may also include a non-volatile memory, for example, one or more magnetic storage devices, a flash memory device, or another non-volatile solid state storage device. The memory 115 may store an operating system, for example, Android, IOS, or Windows, or an embedded operating system such as Linux. The memory 115 may further store a network communications program. The network communications program may be configured to communicate with one or more adjuncts, one or more terminal devices, or one or more network devices. The memory 115 may further store a user interface program. The user interface program may display content of an application program visually and realistically by using a graphical operation interface, and receive a control operation of the user on the application program by using an input control such as a menu, a dialog box, or a key.

The memory 115 may further store one or more programs. As shown in FIG. 10, the programs may include: a social application program, for example, Facebook; an image management application program, for example, an album; a map application program, for example, Google Maps; and a browser, for example, Safari or Google Chrome.

Figure 11:
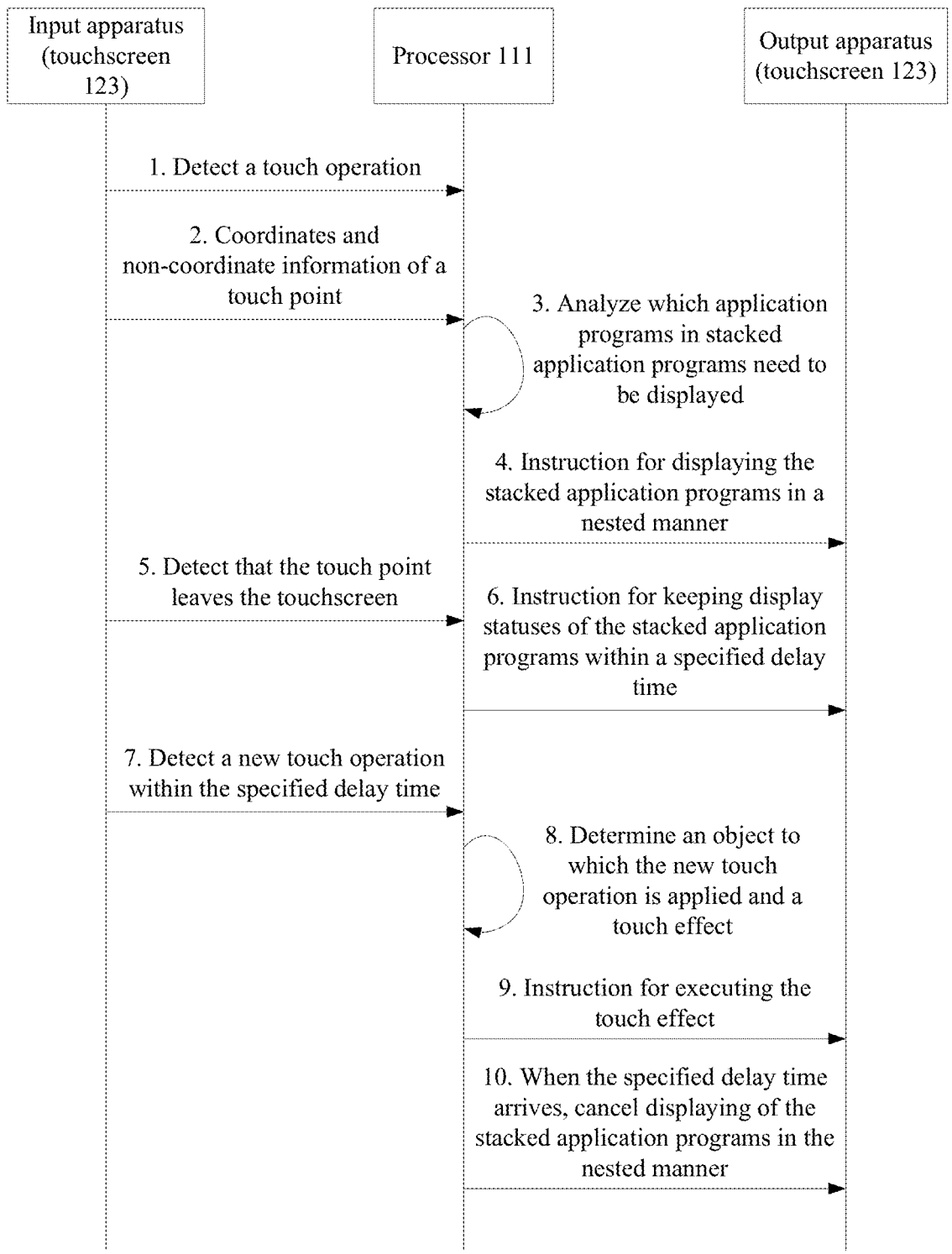
FIG. 11 is a schematic flowchart for processing a user operation by the terminal in FIG. 10 according to an embodiment of the present invention.

Using a touch operation as an example, FIG. 11 describes two main user operation processing phases in this embodiment of the present invention from an internal processing procedure of the terminal 100. A first phase (1-5) mainly deals with how the terminal 100 processes a user operation used to view stacked application programs, that is, the first input. A second phase (6-10) mainly deals with how the terminal 100 processes a user operation used to adjust display statuses of the displayed stacked application programs, that is, the second input.

1. On condition that a plurality of application programs running on the terminal 100 are stacked for displaying on the input apparatus, for example, the touchscreen 123, the touchscreen 123 detects a touch operation, and notifies the processor 111. The processor 111 determines that the touch operation is the user operation used to view the stacked application programs, that is, the first input.

2. The touchscreen 123 sends touch point information of the touch operation in step 1 to the processor 111. The touch point information includes position information and non-position information. The position information is coordinates, and the non-position information is non-coordinate information. The non-coordinate information may be touch pressure captured by a pressure sensor under the touchscreen 123, or may be a touch area captured by the touchscreen 123, or may be touch duration captured by a timer. The processor 111 may obtain the corresponding non-position information by using the pressure sensor, the touchscreen, the timer, or the like separately.

3. With reference to the application programs that are currently stacked for displaying on the touchscreen 123 and the touch point information obtained in step 2, including the coordinates and the non-coordinate information, the processor 111 analyzes which application programs in the stacked application programs need to be displayed. Herein, the application programs that can be displayed are application programs that are reachable by the first input in step 1 at a touch point, namely, a position of the coordinates.

Specifically, the processor 111 may instruct the touchscreen 123 to display the reachable application programs in a nested manner by using the coordinates as a center. For an implementation about how to display the reachable application programs in the nested manner, refer to content in the foregoing embodiment. Details are not further described herein.

4. The processor 111 sends, to the output apparatus such as the touchscreen 123, an instruction for displaying the stacked application programs in the nested manner, triggering the touchscreen 123 to display content correspondingly output by each of the reachable application programs in a corresponding display area.

It should be noted that, after the first input is detected, the processor 111 may perform steps 2 to 4 repeatedly to obtain real-time touch point information of the first input. This is because the touch point information of the first input such as the coordinates and the non-coordinate information may change in real time.

5. The touchscreen 123 detects that the touch point of the touch operation in step 1 leaves the screen, and therefore notifies the processor 111. It can be learned according to the foregoing embodiment that, if the touchscreen 123 still can obtain the touch point information by sampling at a sampling time T, but cannot obtain the touch point information by sampling at a sampling time T+1, it is determined that the touch point leaves the touchscreen 123 at the sampling time T+1. Herein, that the touch point leaves the screen means that the first input is released.

6. The processor 111 sends, to the touchscreen 123, an instruction for keeping the display statuses of the stacked application programs within a specified delay time, so as to instruct the touchscreen 123 to keep the display statuses of the stacked application programs within the specified delay time after the touch point leaves the screen.

It is assumed that the touch point leaves the screen at the sampling time T+1. There are the following two cases about leaving the screen.

In a first case, the touch point leaves the screen slowly. In a process of leaving the screen, a numeric value of the non-coordinate information such as the touch pressure of the first input decreases slowly, and the numeric value of the non-coordinate information of the first input at the sampling time T has decreased to 0. That is, at the sampling time T, there is already no application program that is reachable by the first input in the position of the coordinates, and deep layer application programs originally displayed on the touchscreen 123 have disappeared. The touchscreen 123 recovers to a display status that exists before the first input is received.

In a second case, the touch point leaves the screen quickly. In a process of leaving the screen, a numeric value of the non-coordinate information such as the touch pressure of the first input decreases quickly, but the numeric value of the non-coordinate information of the first input at the sampling time T does not decrease to 0, and may even keep the same as that existing before leaving the screen starts. That is, at the sampling time T, there are already some application programs that are reachable by the first input in the position of the coordinates. For the second case, within the specified delay time after the touch point leaves the screen, the touchscreen 123 keeps the display status that exists before the touch point leaves the screen.

7. Within the specified delay time after the touch point leaves the screen, the touchscreen 123 detects a new touch operation, for example, tap or swipe, and notifies the processor 111. The processor 111 determines that the new touch operation is the second input.

8. The processor 111 determines an application program that is an object to which the new touch operation is applied, and a touch effect corresponding to the new touch operation.

9. The processor 111 sends an instruction for executing the touch effect to the touchscreen 123, so as to instruct the touchscreen 123 to execute the touch effect. For a specific implementation about steps 8 and 9, refer to the foregoing embodiment. Details are not further described herein.

10. If the touchscreen 123 does not detect any new touch operation within the specified delay time after the touch point leaves the screen, when the specified delay time arrives, the processor 111 sends, to the touchscreen 123, an instruction for canceling displaying of the stacked application programs in the nested manner, so as to instruct the touchscreen 123 to cancel displaying of the content correspondingly output by each of the nested reachable application programs in the corresponding display area.

It should be noted that, the input apparatus in FIG. 11 may also be a gesture sensor. Correspondingly, a user operation detected by the gesture sensor is a gesture operation. Correspondingly, the touch point is a point to which the gesture operation is applied. In an actual application, the input apparatus in FIG. 11 may also be an input apparatus of another type. This is not limited herein.

It should be understood that, the terminal 100 is merely an example provided by this embodiment of the present invention. In addition, a quantity of components of the terminal 100 may be greater than or less than that shown, or two or more components may be combined, or different configurations of components may be implemented.

Based on the terminal 100 described in the embodiment in FIG. 10, the following describes a method for viewing an application program according to an embodiment of the present invention.

Figure 12:
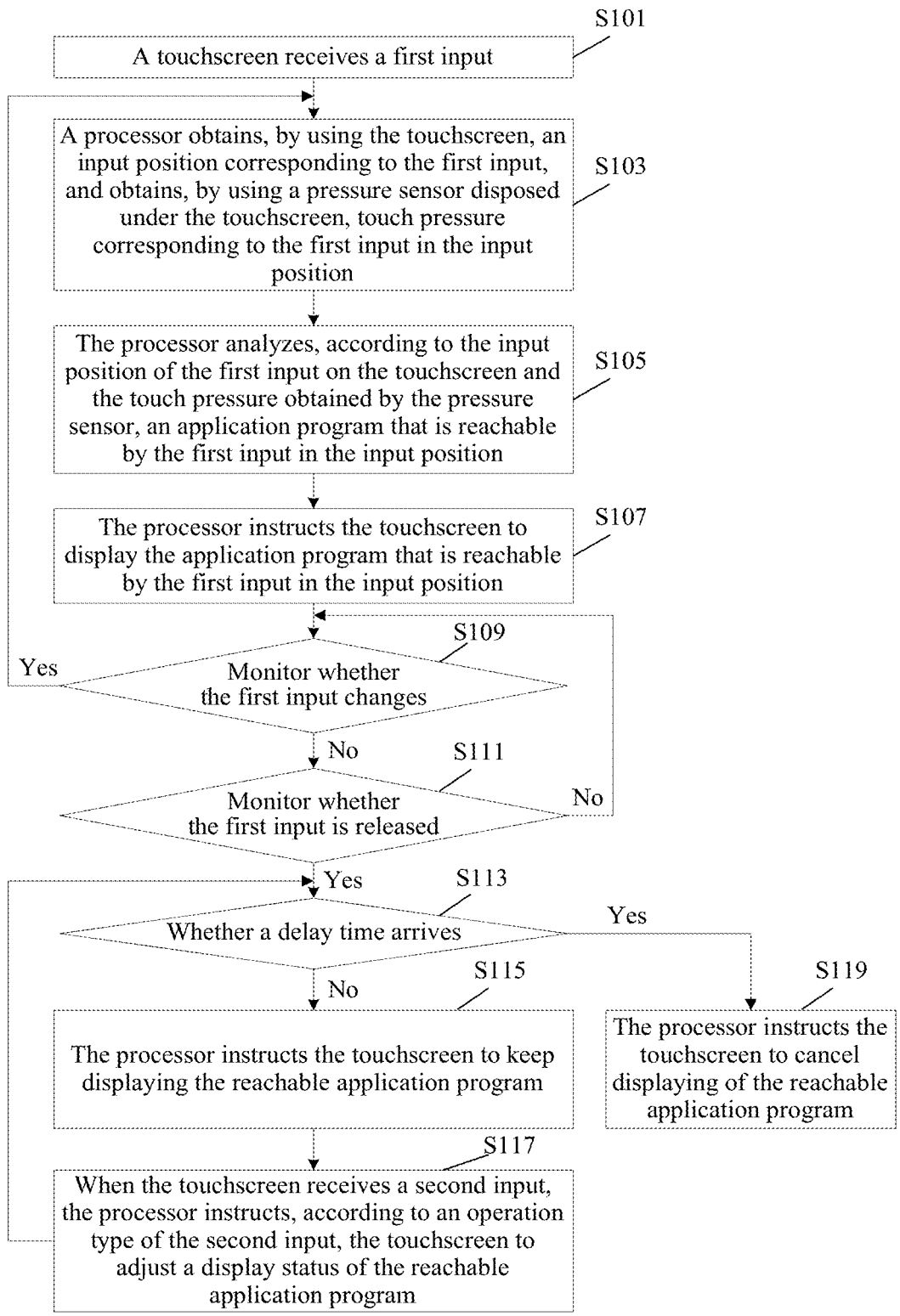
FIG. 12 is a schematic flowchart of a method for viewing an application program according to an embodiment of the present invention.

Referring to FIG. 12, FIG. 12 is a schematic flowchart of a method for viewing an application program according to an embodiment of the present invention. In the embodiment in FIG. 12, the first input is a touch operation applied to a touchscreen of a terminal, and non-coordinate information of the first input is touch pressure. As shown in FIG. 12, the method includes the following steps.

S101. A touchscreen receives a first input. Specifically, a plurality of running application programs are stacked for displaying in a first display area of the touchscreen. The first display area may occupy the entire touchscreen, or may occupy a part of the touchscreen, for example, a split-screen application. The first input is used to view the application programs that are stacked for displaying in the first display area.

S103. The processor obtains, by using the touchscreen, an input position corresponding to the first input, and obtains, by using a pressure sensor disposed under the touchscreen, touch pressure of the first input in the input position.

S105. The processor may analyze, according to the input position of the first input on the touchscreen and the touch pressure obtained by the pressure sensor, an application program that is reachable by the first input in the input position.

S107. The processor instructs the touchscreen to display the application program that is reachable by the first input in a position of the coordinates.

Specifically, the application program that is reachable by the first input in the position of the coordinates may be displayed in the first display area of the touchscreen.

In this embodiment of the present invention, the processor may first determine, according to the input position, which stacked application programs are in the input position, and then determine, from the stacked application programs in the input position according to the non-position information, for example, touch pressure Q detected by the pressure sensor, the application program that is reachable by the first input in the input position.

With reference to the foregoing embodiment, it can be learned that, for the first stacking form shown in FIG. 3A to FIG. 3D, because each application program stacked in the first display area 10 occupies the entire first display area 10, all the stacked applications in any position of coordinates in the user interface are the same, that is, including all the application programs stacked in the first display area 10. However, for the second stacking form shown in FIG. 4A and FIG. 4B, because an application program stacked in the first display area 10 may occupy a part of the first display area 10, application programs stacked in different positions in the user interface may vary. For example, as shown in FIG. 4B, application programs stacked in a position of coordinates (X2, Y2) are Google Maps and the album, and do not include the top-layer application Facebook.

Specifically, by using the following method, the processor may determine, according to the non-position information, for example, the touch pressure Q detected by the pressure sensor, the application program that is reachable by the first input in the input position.

Step 1: Calculate a quantity N of the reachable application programs according to the touch pressure Q obtained by the pressure sensor and a logical distance D between application programs in two adjacent layers.

Step 2: Determine, from the stacked application programs in the input position, a first-layer application program to an $N^{th}$-layer application program as the application programs that are reachable by the first input in the input position.

Herein, for how to calculate the quantity N according to the touch pressure Q and the logical distance D, refer to related content in the foregoing embodiment. Details are not further described herein. For definitions of the application programs that are reachable by the first input in the input position, refer to the description in the foregoing embodiment. Details are not further described herein.

It should be noted that, there may be an upper limit for a numeric value of the non-position information that can be identified by the pressure sensor disposed under the touchscreen, for example, the touch pressure. The upper limit is expressed as $Q_{Limit}$.

According to the method for calculating the quantity N of the application programs that are reachable by the first input in the position of the coordinates, as described in the foregoing embodiment, it can be learned that N also has an upper limit, expressed as $Q_{Limit}/D$. It should be understood that, if a quantity M of application programs that are currently stacked is very large, that is, M is greater than $Q_{Limit}/D$, some of the stacked application programs are not reachable by the first input, and therefore, cannot be displayed in the first display area of the touchscreen 123 and seen by a user.

To ensure that every stacked application program has an opportunity to be reachable by the first input, the logical distance D between application programs in two adjacent layers may be dynamic, and $D=Q_{Limit}/M$. That is, the logical distance D may be determined according to the quantity M of the application programs that are currently stacked.

In this embodiment of the present invention, after the application programs that are reachable by the first input in the input position are determined, the processor may display the reachable application programs in the following implementations.

In some implementations, the processor may instruct the touchscreen to display the reachable application programs in a nested manner in the first display area of the touchscreen Dev by using the input position as a center. The nested displaying method may be summarized as follows: The reachable application programs are displayed separately in N sub display areas included in the first display area, where a sub display area displays content correspondingly output by a reachable application program in the sub display area, and a sub display area corresponding to a reachable $i^{th}$-layer application program is nested in a periphery of a sub display area corresponding to a reachable $(i+1)^{th}$-layer application program; where i<N, i is a positive integer, and N is the quantity of the application programs that are reachable by the first input in the input position.

Herein, for a nested displaying effect of the reachable application program, refer to the foregoing embodiment. For the definition and description about content correspondingly output by the reachable application program in a display area, refer to the foregoing embodiment. Details are not further described herein.

It should be noted that, creating a display area corresponding to each reachable application program by using the input position as a center may include the following cases: If the sub display area is a rectangle, the center may be an intersecting point of two diagonal lines of the rectangle; if the sub display area is a circle or an ellipse, the center may be a center of the circle or the ellipse; or if the sub display area is a sector, the center may be a vertex of the sector. A policy for determining "the center" is not limited in this embodiment of the present invention.

In this embodiment of the present invention, the processor triggers the touchscreen in real time to refresh content correspondingly output by each reachable application program in the display area corresponding to the application program.

In some implementations, with reference to the foregoing embodiment in FIG. 9, it can be learned that the processor may also instruct the touchscreen to display, in the first display area, only a bottom-layer application program that is reachable by the first input in the position of the coordinates. For a specific example, refer to the foregoing embodiment. Details are not further described herein.

In this embodiment of the present invention, the processor may further monitor a real-time change of the first input by using the touchscreen and the pressure sensor.

To monitor this change, as shown in FIG. 12, the method for viewing an application program according to this embodiment of the present invention further includes: S109. The processor monitors, by using the touchscreen, whether the first input changes. If the first input changes, the processor may perform S103 to S107 repeatedly to adjust display statuses of the stacked application programs in time according to a real-time status of the first input.

If the touchscreen detects that the input position of the first input changes, the processor may determine an application program that is reachable by the first input in a new input position, and then the processor may instruct the touchscreen to display, in the nested manner in the first display area by using the new input position as a center, the application program that is reachable by the first input in the new input position. For how to display, in the nested manner by using the new input position as a center, the application program that is reachable by the first input in the new input position, refer to the foregoing embodiment. Details are not further described herein.

If the pressure sensor detects an increase of the numeric value of the non-position information such as the touch pressure of the first input, the processor may determine an added application program that is reachable by the first input in the input position, and then instruct the touchscreen to create, in a display area of a current reachable bottom-layer application program, a sub display area for displaying the added reachable application program.

If the pressure sensor detects a decrease of the numeric value of the non-position information such as the touch pressure of the first input, the processor may determine an application program that is no longer reachable by the first input in the input position, and then instruct the touchscreen to remove, from a display area of an application program in a layer above the application program that is no longer reachable, a display area corresponding to the deep layer application program that is no longer reachable.

In this embodiment of the present invention, the real-time change of the first input may include a change of the input position, or a change of the non-position information, or a simultaneous change of both.

In this embodiment of the present invention, the first input may be released. For the definition and description about releasing of the first input, refer to the foregoing embodiment. Details are not further described herein. As shown in FIG. 12, the method for viewing an application program according to this embodiment of the present invention may further include: S111. The processor monitors, by using the touchscreen, whether the first input is released. If the first input is released, the processor may instruct, within a specified delay time, for example, two seconds, the touchscreen to keep displaying the reachable application program in the first display area, as shown in S115. In this way, the user can implement an operation of adjusting a display status of the reachable application program in the first display area within the specified delay time, for example, cancel displaying of the application program. In this embodiment of the present invention, this operation is referred to as a second input. If the specified delay time arrives, the processor may instruct the touchscreen to cancel displaying of the reachable application program in the first display area, as shown in S119.

Specifically, as shown in S117, within the specified delay time, if the touchscreen detects the second input, the processor may instruct, according to an operation type of the second input, the touchscreen to adjust the display status of the application program that is reachable by the first input in the input position in the first display area of the touchscreen. For specific implementations and descriptions about the second input and an operation effect corresponding to the second input, refer to the foregoing embodiment. Details are not further described herein.

It should be noted that, without being limited to FIG. 12, if the first input is a touch operation detected by the touchscreen, the non-position information corresponding to the first input may also be a touch area captured by the processor by using the touchscreen, or may be a touch time recorded by the processor by using a timer. This is not limited herein.

It should be noted that, without being limited to the touch operation detected by the touchscreen as described in the foregoing content, the first input may also be a gesture operation detected by a gesture sensor. Correspondingly, the non-position information corresponding to the first input may be a gesture depth obtained by the processor by using the gesture sensor. That the first input is released may be that a hand portion such as a finger or an arm of the user leaves a sensing range of the gesture sensor of the terminal. In an actual application, the first input may also be an input operation of another type. This is not limited herein.

It should be noted that, for content not mentioned in the embodiment in FIG. 12, reference may be made to the foregoing embodiments in FIG. 1 to FIG. 11. Details are not further described herein.

Figure 13:
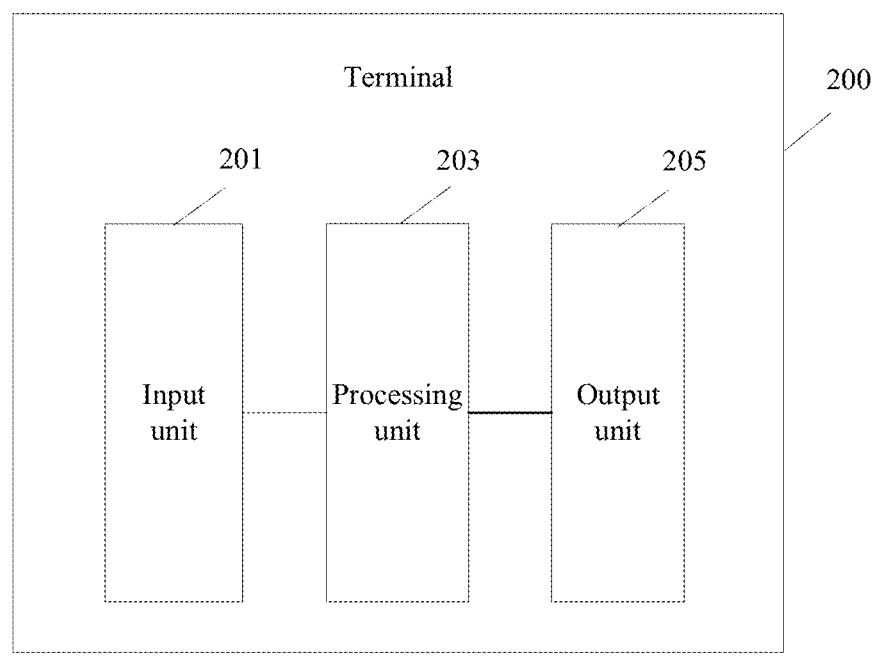
FIG. 13 is a functional block diagram of a terminal according to an embodiment of the present invention.

FIG. 13 is a functional block diagram of a terminal according to an embodiment of the present invention. Functional blocks of the terminal may implement the solution of the present invention by means of hardware, software, or a combination of hardware and software. A person skilled in the art should understand that, functional blocks described in FIG. 13 may be combined or divided into several subblocks to implement the solution of the present invention. Therefore, the content described in the present invention above may support any combination, division, or further definition of the following functional modules. As shown in FIG. 13, the terminal 200 may include an input unit 201, a processing unit 203, and an output unit 205.

The input unit 201 is configured to receive a first input.

The processing unit 203 is configured to obtain an input position corresponding to the first input and non-position information corresponding to the first input in the input position.

The processing unit 203 is further configured to analyze, according to the input position and the non-position information, an application program that is reachable by the first input in the input position.

The output unit 205 is configured to display the application program that is reachable by the first input in the input position.

Specifically, the output unit 205 may be a touch display, for example, the touchscreen 123 in FIG. 10. The first input is used to view application programs that are stacked for displaying in a first display area of the output unit 205.

Specifically, the input unit 201 may be the touchscreen 123 in FIG. 10, or may be the gesture sensor in FIG. 10, or may be another input apparatus. Correspondingly, the first input may be a touch operation detected by the touchscreen 123, or may be a gesture input detected by the gesture sensor, or may be a user operation of another type.

Herein, for how the processing unit 203 determines the application program that is reachable by the first input in the input position, refer to the foregoing embodiment. Details are not further described herein.

In some embodiments, the output unit 205 may display the reachable application programs in a nested manner. Specifically, the output unit 205 may be configured to separately display the reachable application programs in N sub display areas included in the first display area, where a sub display area displays content correspondingly output by a reachable application program in the sub display area, and a sub display area corresponding to a reachable $i^{th}$-layer application program is nested in a periphery of a sub display area corresponding to a reachable $(i+1)^{th}$-layer application program; where i<N, i is a positive integer, and N is a quantity of the application programs that are reachable by the first input in the input position.

In some possible implementations, with reference to the foregoing embodiment, it can be learned that, the output unit 205 may be configured to display, in the first display area, only a bottom-layer application program that is reachable by the first input in a position of the coordinates.

In some possible implementations, if the input unit 201 detects a change of the input position of the first input, the processor unit 203 may determine an application program that is reachable by the first input in a new input position, and then the output unit 205 may display, in the nested manner in the first display area by using the new input position as a center, the application program that is reachable by the first input in the new input position.

In some possible implementations, if the input unit 201 detects an increase of a numeric value of the non-position information such as touch pressure of the first input, the processor unit 203 may determine an added application program that is reachable by the first input in the input position, and the output unit 205 may create, in a display area of a current reachable bottom-layer application program, a sub display area for displaying the added reachable application program.

In some possible implementations, if the input unit 201 detects a decrease of a numeric value of the non-position information such as touch pressure of the first input, the processor unit 203 may determine an application program that is no longer reachable by the first input in the input position, and the output unit 205 may remove, from a display area of an application program in a layer above the application program that is no longer reachable, a display area corresponding to the deep layer application program that is no longer reachable.

In some possible implementations, the input unit 201 may be further configured to monitor whether the first input is released. If the first input is released, the output unit 205 keeps displaying the reachable application program in the first display area within a specified delay time, for example, two seconds.

Within the specified delay time, the input unit 201 may further detect the second input. In response to the second input, the output unit 205 may adjust, according to an operation type of the second input, a display status of the application program that is reachable by the first input in the input position in the first display area. For specific implementations and descriptions about the second input and an operation effect corresponding to the second input, refer to the foregoing embodiment. Details are not further described herein.

It may be understood that, for a specific implementation of functional blocks included in the terminal 200 in FIG. 13, reference may be made to the foregoing embodiment. Details are not further described herein.

In implementations of the method embodiment of the present invention, the input position and the non-position information corresponding to the user operation (namely, the first input) used to view the stacked application programs are obtained, the application program that is reachable by the first input in the input position is determined according to the input position and the non-position information, and finally, the reachable application program is displayed in a user interface. The foregoing solution can simplify an operation of viewing a blocked application program in the stacked application programs by a user, and can implement simultaneous displaying of content output by a plurality of application programs in the stacked application programs, making it convenient for the user to view the stacked application programs.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media, including but not limited to a magnetic disk storage, an optical storage, and the like that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A terminal, comprising:
   a touch sensitive display;
   at least one processor; and
   a memory, wherein the memory comprises instructions that, when executed by the at least one processor, cause the terminal to be configured to:
   receive a first input indicating a request to launch a first application;
   launch the first application in response to receiving the first input;
   display a first user interface of the first application on the touch sensitive display;
   receive a second input indicating a request to launch a second application on the touch sensitive display;
   launch the second application in response to receiving the second input;
   display a second user interface of the second application on the touch sensitive display;
   receive a third input indicating a request to launch a third application;
   launch the third application in response to receiving the third input;
   display a third user interface of the third application on the touch sensitive display;
   detect a first touch duration or a first touch area applied by a fourth input at a first location on the third user interface of the third application;
   display first content of the second application at a first area on the touch sensitive display in response to detecting the first touch duration or the first touch area applied by the fourth input at the first location, wherein the first content of the second application corresponds to a part of the second user interface of the second application, wherein the first area is located entirely within the third user interface of the third application, and wherein a first center of the first content of the second application is located where the first touch duration or the first touch area is detected;
   detect a second touch duration or a second touch area applied by a fifth input at a second location on the first content of the second application; and
   display second content of the first application at a second area on the touch sensitive display in response to the second touch duration or the second touch area applied by the fifth input at the second location, wherein the second content of the first application corresponds to a part of the first user interface of the first application, wherein the second area of the first application is located entirely within the first area of the second application, wherein a second center of the second content of the first application is located where the second touch duration or the second touch area is detected, and wherein the third user interface of the third application, the first content of the second application, and the second content of the first application are displayed simultaneously on the touch sensitive display.

2. The terminal of claim 1, wherein the first content of the second application is displayed at the first area together with the second content of the first application at the second area in response to the second touch duration or the second touch area applied by the fifth input at the first location.

3. The terminal of claim 2, wherein when executed by the at least one processor, the instructions further cause the terminal to be configured to:
   receive an eighth input at the second area within a preset time since the second touch duration or the second touch area applied by the fifth input is released; and adjust the display of the second content of the first application according to the eighth input.

4. The terminal of claim 3, wherein the eighth input comprises a wipe operation at the second area, and wherein the display of the second content of the first application is cancelled according to the wipe operation.

5. The terminal of claim 3, wherein the eighth input comprises a tap operation at the second area, and wherein the first user interface of the first application is displayed on a full screen of the touch sensitive display.

6. The terminal of claim 1, wherein when executed by the at least one processor, the instructions further cause the terminal to be configured to:
   detect a third touch duration or a third touch area applied by a sixth input at a third location on the third user interface of the third application;
   display third content of the second application at a fourth area on the touch sensitive display in response to detecting the third touch duration or the third touch area applied by the sixth input at the third location;
   detect a fourth touch duration or a fourth touch area applied by a seventh input at the third location; and
   display a fourth content of the first application at a fifth area on the touch sensitive display in response to the fourth touch duration or the fourth touch area applied by the seventh input at the third location.

7. The terminal of claim 1, wherein when executed by the at least one processor, the instructions further cause the terminal to be configured to:
   detect that either the first touch duration or the first touch area applied by the fourth input or the second touch duration or the second touch area applied by the fifth input is released; and
   cancel the display of the first content of the second application or the second content of the first application when a preset time expires.

8. The terminal of claim 1, wherein either an icon corresponding to the second application is displayed at a corner of the first area, or an icon corresponding to the first application is displayed at a corner of the second area.

9. The terminal of claim 1, wherein either a size of the first area is associated with the first touch duration or the first touch area applied by the fourth input, or a size of the second area is associated with the second touch duration or the second touch area applied by the fifth input.

10. The terminal of claim 1, wherein when executed by the at least one processor, the instructions further cause the terminal to be configured to:
    detect the second touch duration or the second touch area applied by the fifth input is decreased to the first touch duration or the first touch area at the first location; and
    display the first content of the second application at the first area on the touch sensitive display.

11. The terminal of claim 1, wherein the first content of the second application is displayed in a first rectangular area, wherein the second content of the first application is displayed in a second rectangular area, wherein the first center of the first content is located at a first intersecting point of two diagonal lines of the first rectangular area, and wherein the second center of the second content is located at a second intersecting point of two diagonal lines of the second rectangular area.

12. The terminal of claim 1, wherein the first content of the second application is displayed in a first circular or elliptical area, wherein the second content of the first application is displayed in a second circular or elliptical area, wherein the first center of the first content is located at a first center of the first circular or elliptical area, and wherein the second center of the second content is located at a second center of the second circular or elliptical area.

13. A method for displaying applications on a touch sensitive display of a terminal, comprising:
    receiving a first input indicating a request to launch a first application;
    launching the first application in response to receiving the first input;
    displaying a first user interface of the first application on the touch sensitive display;
    receiving a second input indicating a request to launch a second application on the touch sensitive display;
    launching the second application in response to receiving the second input;
    displaying a second user interface of the second application on the touch sensitive display;
    receiving a third input indicating a request to launch a third application;
    launching the third application in response to receiving the third input;
    displaying a third user interface of the third application on the touch sensitive display;
    detecting a first touch duration or a first touch area applied by a fourth input at a first location on the third user interface of the third application;
    displaying first content of the second application at a first area on the touch sensitive display in response to detecting the first touch duration or the first touch area applied by the fourth input at the first location, wherein the first content of the second application corresponds to a part of the second user interface of the second application, wherein the first area is located entirely within the third user interface of the third application, and wherein a first center of the first content of the second application is located where the first touch duration or the first touch area is detected;
    detecting a second touch duration or a second touch area applied by a fifth input at a second location on the first content of the second application; and
    displaying second content of the first application at a second area on the touch sensitive display in response to the second touch duration or the second touch area applied by the fifth input at the second first location, wherein the second content of the first application corresponds to a part of the first user interface of the first application, wherein the second area of the first application is located entirely within the first area of the second application, wherein a second center of the second content of the first application is located where the second touch duration or the second touch area is detected, and wherein the third user interface of the third application, the first content of the second application, and the second content of the first application are displayed simultaneously on the touch sensitive display.

14. The method of claim 13, wherein the first content of the second application is displayed at the first area together with the second content of the first application at the second area in response to the second touch duration or the second touch area applied by the fifth input at the first location.

15. The method of claim 14, further comprising:
    receiving an eighth input at the second area within a preset time since the second touch duration or the second touch area applied by the fifth input is released; and
    adjusting the display of the second content of the first application according to the eighth input.

16. The method of claim 15, wherein the eighth input comprises a wipe operation at the second area, and wherein the display of the second content of the first application is cancelled according to the wipe operation.

17. The method of claim 15, wherein the eighth input comprises a tap operation at the second area, and wherein the first user interface of the first application is displayed on a full screen of the touch sensitive display.

18. The method of claim 13, further comprising:
detecting a third touch duration or a third touch area applied by a sixth input at a third second location on the third user interface of the third application;
displaying third content of the second application at a fourth area on the touch sensitive display in response to detecting the third touch duration or the third touch area applied by the sixth input at the third location;
detecting a fourth touch duration or a fourth touch area applied by a seventh input at the third location; and
displaying fourth content of the first application at a fifth area on the touch sensitive display in response to the fourth touch duration or the fourth touch area applied by the seventh input at the third location.

19. The method of claim 13, further comprising:
detecting that either the first touch duration or the first touch area applied by the fourth input or the second touch duration or the second touch area applied by the fifth input is released; and
cancelling the display of the first content of the second application or the second content of the first application when a preset time expires.

20. The method of claim 13, further comprising:
detecting the second touch duration or the second touch area applied by the fifth input is decreased to the first touch duration or the first touch area at the first location; and
displaying the first content of the second application at the first area on the touch sensitive display.

* * * * *

UNITED STATES PATENT AND TRADEMARK OFFICE
CERTIFICATE OF CORRECTION

PATENT NO. : 11,314,388 B2
APPLICATION NO. : 16/313796
DATED : April 26, 2022
INVENTOR(S) : Liang Yu It is certified that error appears in the above-identified patent and that said Letters Patent is hereby corrected as shown below:

In the Claims

Claim 18, Column 29, Line 11: "a third second location on" should read "a third location on"

Signed and Sealed this
Ninth Day of August, 2022

Katherine Kelly Vidal
*Director of the United States Patent and Trademark Office*